United States Patent
Hirabayashi et al.

(10) Patent No.: US 10,542,224 B2
(45) Date of Patent: Jan. 21, 2020

(54) IMAGING DEVICE AND IMAGE PROCESSING METHOD

(71) Applicant: MAXELL, LTD., Kyoto (JP)

(72) Inventors: Masayuki Hirabayashi, Kyoto (JP); Yasunobu Hashimoto, Kyoto (JP); Hiroshi Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 11 days.

(21) Appl. No.: 15/739,097

(22) PCT Filed: Jun. 26, 2015

(86) PCT No.: PCT/JP2015/068535
§ 371 (c)(1),
(2) Date: Dec. 21, 2017

(87) PCT Pub. No.: WO2016/208070
PCT Pub. Date: Dec. 29, 2016

(65) Prior Publication Data
US 2018/0241951 A1 Aug. 23, 2018

(51) Int. Cl.
*H04N 5/272* (2006.01)
*G06K 9/00* (2006.01)
*H04N 5/232* (2006.01)

(52) U.S. Cl.
CPC ......... *H04N 5/272* (2013.01); *G06K 9/00228* (2013.01); *H04N 5/23219* (2013.01)

(58) Field of Classification Search
CPC .. H04N 5/232; H04N 5/23219; H04N 5/2625; H04N 5/272; H04N 5/772; G06K 9/00228; G06K 9/00664; G11B 27/31
See application file for complete search history.

(56) References Cited

U.S. PATENT DOCUMENTS 7,221,395 B2 * 5/2007 Kinjo ............... H04N 1/3872
348/239
2006/0025071 A1 2/2006 Yamazaki et al.
(Continued)

FOREIGN PATENT DOCUMENTS

CN 1720527 A 1/2006
CN 103747180 A 4/2014
(Continued)

OTHER PUBLICATIONS

Search Report issued in corresponding International Patent Application No. PCT/JP2015/068535, dated Oct. 6, 2015.
(Continued)

*Primary Examiner* — Lin Ye
*Assistant Examiner* — Chriss S Yoder, III
(74) *Attorney, Agent, or Firm* — McDermott Will & Emery LLP

(57) ABSTRACT

There is provided an imaging device including: an image processing unit; a face recognition processing unit; a storage unit; and a composition processing unit for generating composite data by a composition process so that persons photographed in each of a plurality of image data are included in one image data. The face recognition processing unit recognizes a first person by performing a face recognition process on first image data. When second image data obtained by photographing a second person at the different photographing timing of the first image data, with the same background as the first image data, is recorded in the storage unit, the composition processing unit generates composite data in which the first person and the second person are superimposed on the same background.

8 Claims, 23 Drawing Sheets

(56) References Cited

U.S. PATENT DOCUMENTS

| | | |
|---|---|---|
| 2010/0086175 A1 | 4/2010 | Yokono et al. |
| 2010/0086176 A1 | 4/2010 | Yokono et al. |
| 2011/0135192 A1 | 6/2011 | Yokono |
| 2012/0120273 A1* | 5/2012 | Amagai ............ H04N 5/23203 |
| | | 348/222.1 |

FOREIGN PATENT DOCUMENTS

| | | |
|---|---|---|
| JP | 2010-108475 A | 5/2010 |
| JP | 2012-109693 A | 6/2012 |

OTHER PUBLICATIONS

First Office Action issued corresponding Chinese Application No. 201580079346.8, dated Aug. 14, 2019, with English translation.

* cited by examiner

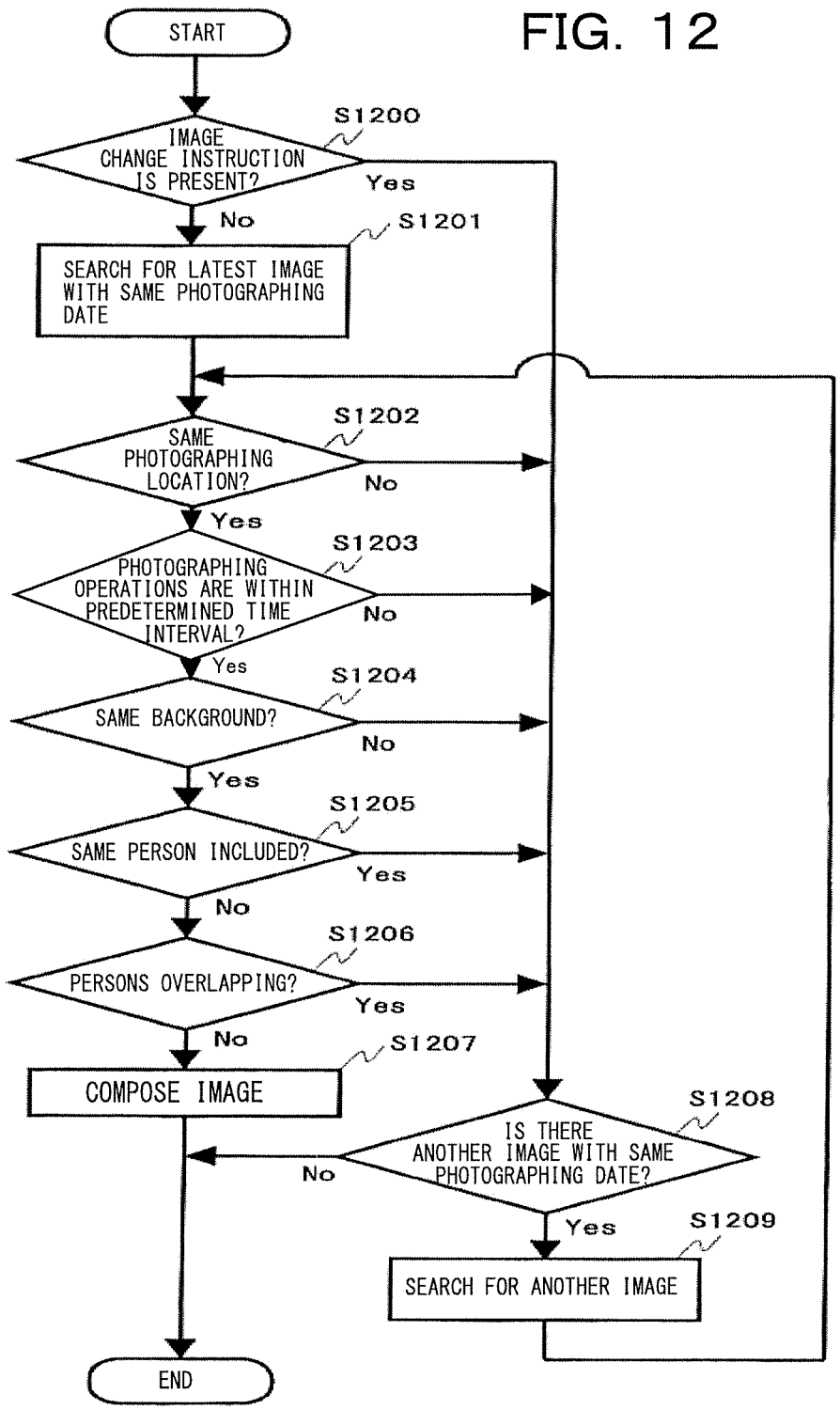

IMAGING DEVICE AND IMAGE PROCESSING METHOD

CROSS REFERENCE

This application is the U.S. National Phase under 35 U.S.C. § 371 of International Application No. PCT/JP2015/068535, filed on Jun. 26, 2015, the entire content of which is hereby incorporated by reference.

TECHNICAL FIELD

The present invention relates to an imaging device and an image processing method. More particularly, the present invention relates to a technique for compositing image data obtained by photographing a plurality of persons.

BACKGROUND ART

As background art of this technical field, Patent Literature 1 addresses the problem of "being able to easily take a group photo of a plurality of persons including the photographer", and discloses the following technique as a means for solving this problem. "In a digital camera, a photographed image "a" of (a plurality of) persons to be photographed other than a photographer is photographed by the photographer, just after a composition imaging mode is instructed. Next, the digital camera is given to any one of the other persons to be photographed and a photographed image "b" of only the former photographer is photographed. Then, in a predetermined composition condition, for example, when a plurality of faces with a size greater than a predetermined size are present in one photographed image and one face with a size greater than the predetermined size is present in the other photographed image, or when the composition of persons with the faces detected in each of the two photographed images a and b is different, a new composite image "c" is generated by compositing a face image included in either one of the two photographed images "a" and "b" that are continuously photographed, with the other image. This facilitates the composition of a group photo in which all the plurality of persons are photographed."

CITATION LIST

Patent Literature

Patent Literature 1: US Patent No. 2012/120273 (extract)

SUMMARY OF INVENTION

Technical Problem

In the above described Patent Literature 1, when the photographed images "a" and "b" are continuously photographed (hereinafter referred to as "a series of photographing operations") just after a composition imaging mode is instructed, a composite image "c" is generated based on these photographed images. However, for example, when another shutter chance comes during a series of photographing operations, another image may not be photographed until the series of photographing operations is completed, so that the shutter chance may be missed. In addition, if one picture is not acceptable, it is necessary to re-photograph it from the beginning. Thus, there is room for further improvement in operability for generating a composite photo.

The present invention has been made in view of these circumstances, and an object of the present invention is to provide an imaging device with improved operability for easily generating a photo in which all the plurality of persons are included, as well as an image processing method.

Solution to Problem

The technology described in the claims is used as a means for solving the above described problems. To cite an example, there is provided an imaging device including: an image processing unit for photographing an object to generate image data; a face recognition processing unit for performing a face recognition process on the image data; an image recording unit for recording the image data; and a composition processing unit for generating a composite data by performing a composition process so that the photographed persons in each of a plurality of image data are included in one image data. The face recognition processing unit recognizes the face of a first person by performing the face recognition process on first image data. When second image data obtained by photographing a second person other than the first person at an arbitrary photographing timing, which is different from the photographing timing of the first image data, with the same background as the background of the first image data, is recorded in the image recording unit, the composition processing unit generates the composite data in which the first person and the second person are superimposed on the same background by using the first image data and the second image data.

Advantageous Effects of Invention

According to the present invention, it is possible to provide an imaging device with improved operability for easily generating a photo in which all the plurality of persons are included, as well as an image processing method. Problems, configurations, and effects other than those described above will become apparent based on the following description of embodiments of the present invention.

BRIEF DESCRIPTION OF DRAWINGS

FIG. 12 is a flow chart showing an operation example of a composition processing unit according to the second embodiment.

DESCRIPTION OF EMBODIMENT

Figure 1A:
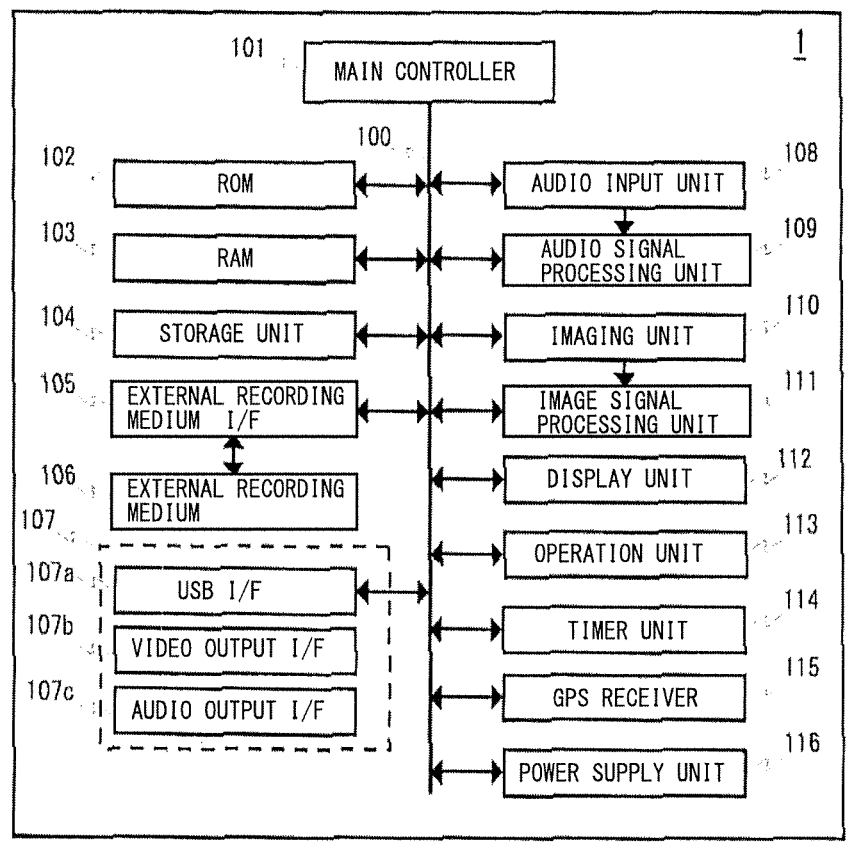
FIG. 1A is a block diagram showing a configuration example of an imaging device according to a first embodiment.

Hereinafter, preferred embodiments of the present invention will be described with reference to the accompanying drawings. Throughout the drawings, the same components are denoted by the same reference numerals and the repetitive description thereof will be omitted. The following embodiments will be described by an example of an imaging device according to the present invention.

First Embodiment

A first embodiment is to compose the image data on display and the image data selected by an imaging device are composed in manual composition mode (operation mode for composition after composition instruction by the user) or in automatic composition mode (operation mode for automatic composition by the imaging device).

[Hardware Configuration of the Imaging Device]

FIG. 1A is a block diagram showing a configuration example of an imaging device according to the first embodiment of the present invention.

In FIG. 1A, a main controller 101 configured with a CPU (Central Processing Unit), or the like, controls the whole of an imaging device 1 according to various operation programs and data stored in ROM (Read Only Memory) 102 or RAM (Random Access Memory) 103. A system bus 100 is a data communication path for transmitting and receiving data between the controller 101 and each of the units within the imaging device 1.

The ROM 102 is a memory in which various programs are stored to control the imaging device 1. For example, rewritable ROM, such as EEPROM (Electrically Erasable Programmable ROM) or flash ROM, is used.

The RAM 103 is used as a temporary storage area when executing the programs stored in the ROM 102, or as a temporary storage of the photographed images.

A storage unit 104 (corresponding to the image recording unit) is to store information such as operation setting values and the like of the imaging device 1. For example, a nonvolatile rewritable device such as a flash ROM or SSD (Solid State Drive) is used.

The ROM 102 and the RAM 103 may be integrated into the main controller 101. Further, a part of the storage area within storage unit 104 may be used for the ROM 102, instead of configuring it as an independent unit as shown in FIG. 1A.

An external recording medium interface (I/F) 105 is an interface for recording and reading information from an external recording medium 106, such as SD card, which is attachable to and detachable from the imaging device 1 like an SD card.

An external interface 107 is a group of interfaces to enhance the function of the imaging device 1. In the present embodiment, the external interface 107 includes a USB (Universal Serial Bus) interface (I/F) 107a, a video output interface (I/F) 107b, and an audio output interface (I/F) 107c. The USB interface 107a is connected to the USB interface of an external device, such as a personal computer or a television receiving device, to allow reading, display, or the like of image data stored in the storage unit 104 or the external recording medium 106. The video output interface 107b and the audio output interface 107c output a video signal/audio signal to an external video/audio output device. Here, the video output interface 107b and the audio output interface 107c can also output video and audio together by using HDMI (High-Definition Multimedia Interface: registered trademark).

An audio input unit 108 is configured with a microphone for converting the peripheral sound of the imaging device 1 into an electrical signal, an A/D converter for converting the sound converted to the electrical signal into digital signal audio data, and the like.

An audio signal processing unit 109 performs a filtering process on the audio data input from the audio input unit, and other processes such as a process for converting the audio data according to the format of the moving image to be recorded in the external recording medium 106.

An imaging unit 110 is configured with the following devices: an optical system device including a lens for zoom and focus operation; a mechanical system device that drives the lens for zoom and focus operation; and an electrical system device such as an image sensor such as CCD or CMOS that converts an optical image of an object input from the lens into an electrical signal, and an A/D converter that converts the image converted to the electrical signal into a digital signal image data.

An image signal processing unit 111 performs image processing, such as white balance adjustment, exposure adjustment, and gamma correction, on the image data input from the imaging unit 110. Further, the image signal processing unit 111 performs processes, such as, for example, converting a moving image to image data with a format such as MPEG2 or H.264, and converting a static image to image data with a format such as JPEG or TIFF, according to the format to be recorded in the external recording medium 106. Further, the image signal processing unit 111 also performs composition process, face recognition process, pattern matching process, and the like, on the image data stored in the storage unit 104 or the external recording medium 106.

A display unit 112 displays an image of an object photographed by the imaging sensor of the imaging unit 110, an image recorded in the storage unit 104 or the external recording medium 106, or a screen for performing various settings of the imaging device 1.

An operation unit 113 is an instruction input unit for inputting an operation instruction to the imaging device 1, including a power ON/OFF button, a shutter button, a reproduction button, a composition button, and other buttons for performing various settings. Further, it may also be possible that a touch panel is provided on the front surface of the display unit 112 so as to input an operation instruction to the imaging device 1 by detecting the position of the button or the like displayed on the display unit 112, as well as the position touched on the touch panel.

A timer unit 114 measures the elapsed time, for example, from the date and time set by the user, by using an RTC (Real Time clock) circuit, and outputs date and time information. The date and time information is added to the image data and recorded based on the date and time information obtained from the timer unit 114.

A GPS receiver 115, which receives radio waves from a plurality of GPS satellites, can obtain location (latitude, longitude, and the like) information based on the received signal. The location info nation is also added to the image data and recorded.

A power supply unit 116 includes a battery (not shown). In response to an instruction from the main controller 101, the power supply unit 116 supplies power to the respective units configuring the imaging device 1 according to the power state such as power-on, power-off, or power-off standby state.

The imaging device 1 may be a device such as digital camera, mobile phone, smartphone, tablet terminal, or navigation device as long as it includes the imaging unit 110, or may be a PDA (Personal Digital Assistants), or a notebook PC (Personal Computer). Further, the imaging device 1 may be a device having a communication function, such as a music player or handheld game console, or other portable digital devices. Further, the imaging device 1 may also be a wearable smart watch or smart glasses.

[Software Configuration of the Imaging Device]

Figure 1B:
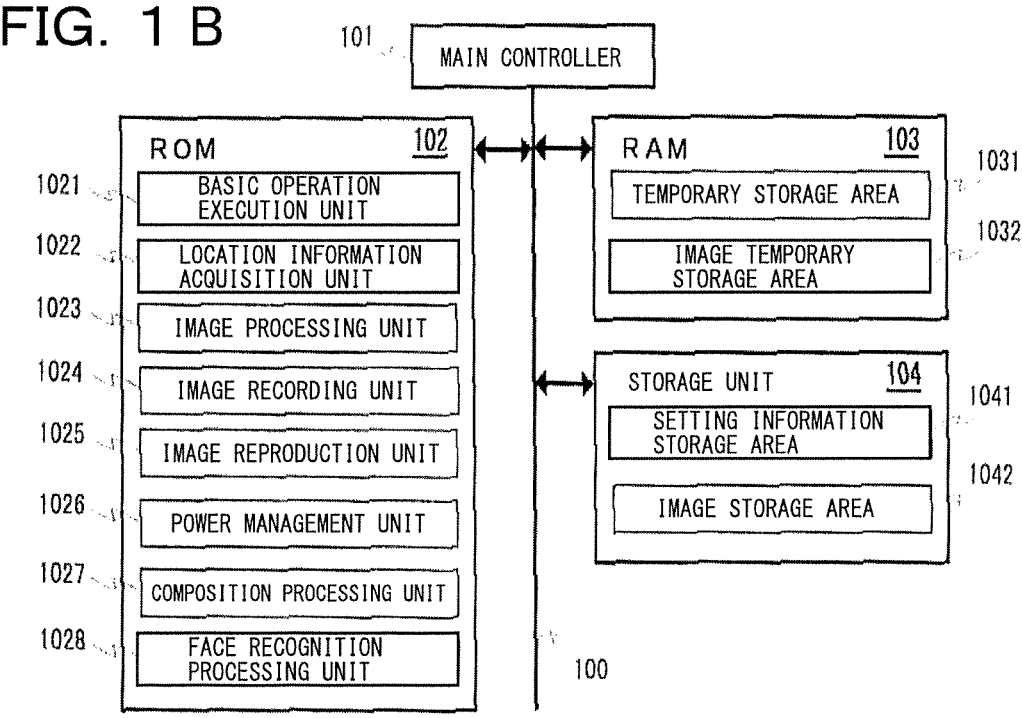
FIG. 1B is a diagram showing the software configuration of the imaging device according to the first embodiment.

FIG. 1B is a diagram showing the software configuration of the imaging device according to the first embodiment, showing the configuration of the software in the ROM 102, the RAM 103, and the storage unit 104.

In FIG. 1B, the main controller 101 executes the programs stored in the ROM 102 to implement a basic operation execution unit 1021, a location information acquisition unit 1022, an image processing unit 1023, an image recording unit 1024, an image reproduction unit 1025, a power management unit 1026, a composition processing unit 1027, and a face recognition processing unit 1028. Further, it is assumed that the RAM 103 includes a temporary storage area 1031 for temporarily store data as appropriate in the execution of the program stored in the ROM 102, and an image temporary storage area 1032 in which the image processing unit 1023 temporarily stores images photographed through the imaging unit 110.

The storage unit 104 also includes areas, such as a setting information storage area 1041 for storing setting information for the execution of the program stored in the ROM 102, and an image storage area 1042 for storing static image data and moving image data that are photographed by the imaging device 1.

Note that in the following, in order to simplify the description, it is assumed that the main controller 101 executes the program stored in the ROM 102 to control each operation block.

The basic operation execution unit 1021 controls various settings of the imaging device 1 as well as the entire operation.

The location information acquisition unit 1022 performs a process for obtaining the location information, such as latitude and longitude of the imaging device 1, based on the signals received by the GPS receiver 115 from the GPS satellites. Further, the location information acquisition unit 1022 may also have a Wi-Fi (registered trademark) reception function to increase the accuracy by correcting the location information by using the information of the Wi-Fi radio wave reception level, or obtain the location information by using the information of the Wi-Fi radio reception level.

When the shutter button included in the operation unit 113 is pressed, the image processing unit 1023 performs the process of importing image data of an object photographed by the imaging unit 110 into the image temporary storage area 1032 of the RAM 103.

The image recording unit 1024 performs the process of recording the image data imported in the image temporary storage area 1032 into the image storage area 1042 of the storage unit 104, or recording the image data into the external recording medium 106 through the external recording medium interface 105.

The image reproduction unit 1025 performs the process of displaying the image of the object, which is photographed by the image sensor of the imaging unit 110, on the display unit 112 through the image temporary storage area 1032 of the RAM 103. Further, the image reproduction unit 1025 performs the process of reading the image data recorded in the external recording medium 106 to display on the display unit 112.

The power management unit 1026 performs the process of controlling the power to be supplied to the respective units configuring the imaging device 1 with a power button included in the operation unit 113.

When the composition button included in the operation unit 113 is pressed or when display of composed image data is selected, the composition processing unit 1027 performs the process of compositing the image data stored in the storage unit 104 or the external recording medium 106.

The face recognition processing unit 1028 performs a face recognition process on the image data stored in the RAM 103, the storage unit 104 or the external recording medium 106.

The programs stored in the ROM 102 as described above may be stored in advance at the time of product delivery.

Alternatively, it may also be possible to store programs obtained from a server device or the like on the Internet by a personal computer, through the USB interface 107a.

Note that a buffer memory for temporarily storing image data may be provided in the imaging unit 110 or the image signal processing unit 111, instead of the image temporary storage area 1032 provided in the RAM 103.

[External View of the Imaging Device]

The exterior of the imaging device according to the first embodiment will be described with reference to FIGS. 2A and 2B.

Figure 2:
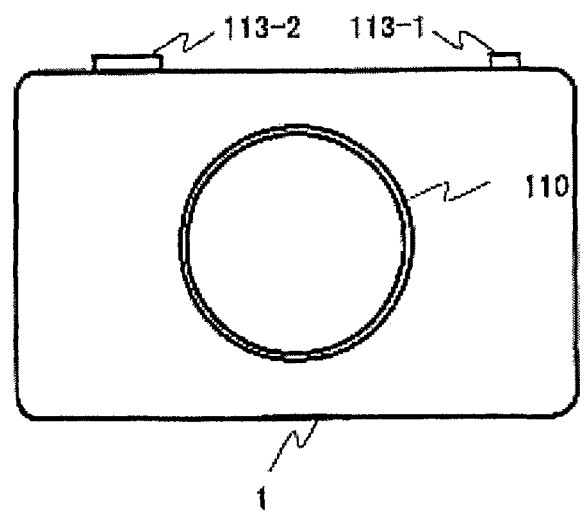
FIG. 2A is a front view of the imaging device according to the first embodiment.
FIG. 2B is a back view of the imaging device according to the first embodiment.
Figure 2:
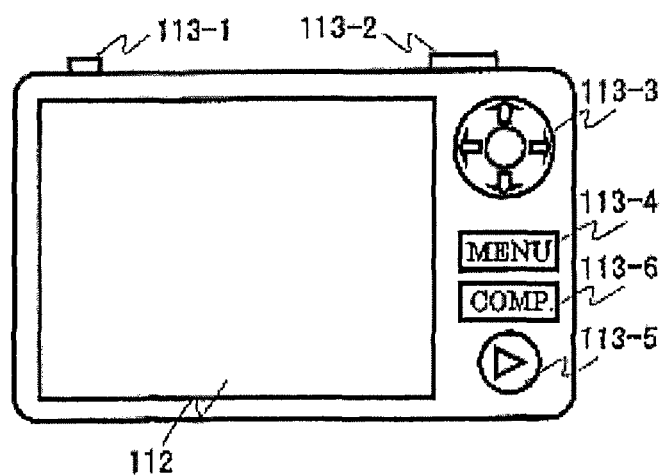

FIG. 2A is a front view of the imaging device 1. A lens configuring the imaging unit 110 is provided in front of the imaging device 1. Further, a power button 113-1 and a shutter button 113-2, which configure the operation unit 113, are provided in the upper part of the imaging device 1.

FIG. 2B is a back view of the imaging device 1. In the back surface of the imaging device 1, there are provided, in addition to the display unit 112, a select/determine operation button 113-3 configuring the operation unit 113, a menu button 113-4 for performing various settings and processes such as file operation process selection, a reproduction button 113-5 for reproducing the image data recorded in the storage unit 104 or the external recording medium 106, and a composition button 113-6 (corresponding to the composition instruction operation unit) for compositing the image data. A touch sensor may be provided in the display unit 112 so that the user can operate the imaging device 1 through the touch sensor, instead of pressing down the shutter button 113-2, the select/determine operation button 113-3, the menu button 113-4, the reproduction button 113-5, and the composition button 113-6.

[Entire Operation of the Imaging Device]

Figure 3:
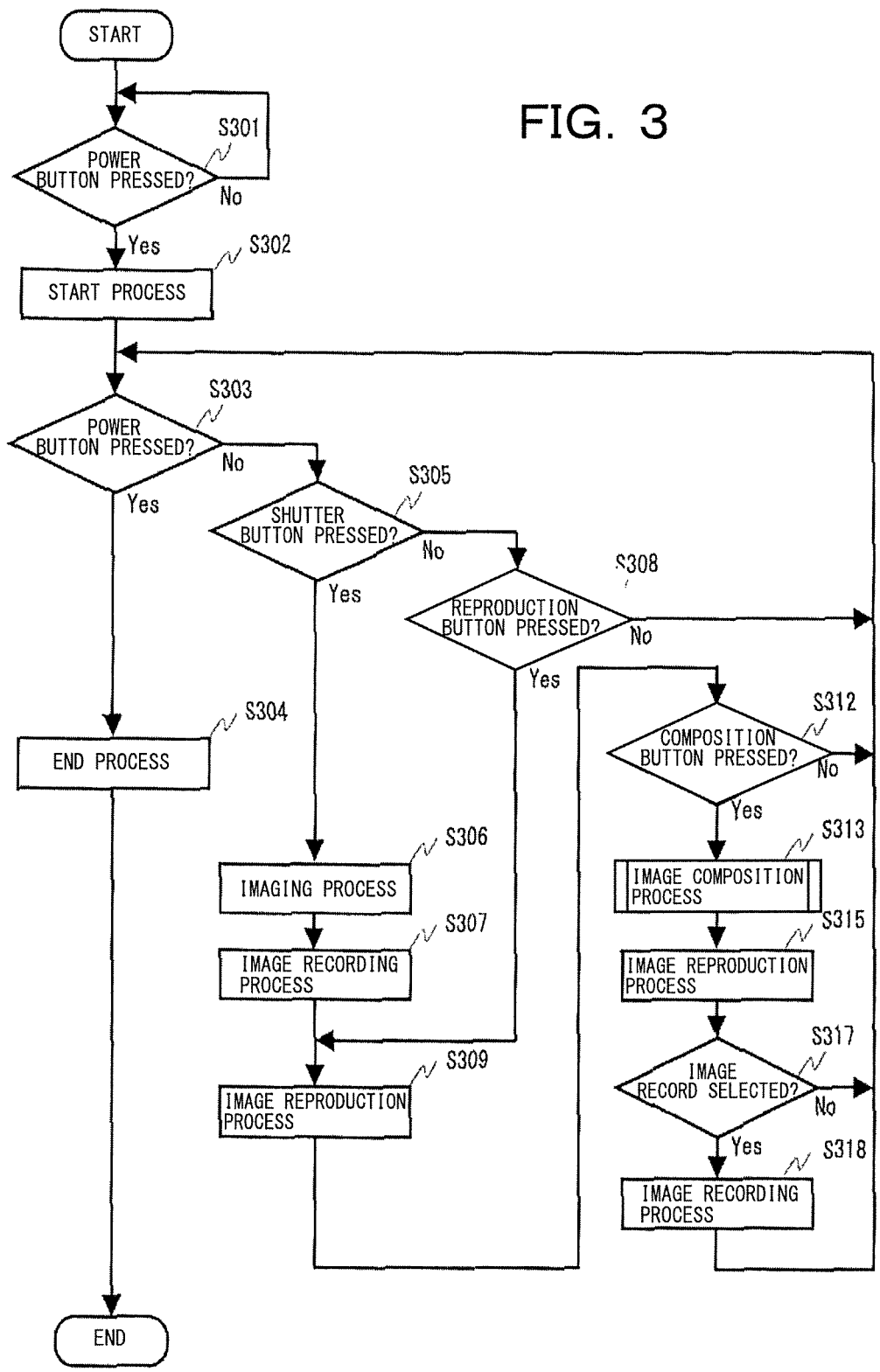
FIG. 3 is a flow chart showing an entire operation example of the imaging device according to the first embodiment.

FIG. 3 is a flow chart showing an entire operation example of the imaging device according to the first embodiment. FIG. 3 describes the flow of operation when the image composition process (S313) is performed in a manual mode, in other words, triggered by the input operation perforated by the user to instruct image composition, and more specifically by a "press of the image composition button (S312: YES)" in the following example.

First, the power management unit 1026 confirms the press of the power button 113-1. If the power button 113-1 is not pressed (S301: NO), the power management unit 1026 stands by and waits in this step without transition to the next step.

If the power button 113-1 is pressed (S301: YES), the power management unit 1026 performs the start-up process of the imaging device 1 (S302). When starting up, the imaging device 1 displays an image of an object, which is being photographed by the image sensor of the imaging unit 110, on the display unit 112.

The power management unit 1026 confirms the press of the power button 113-1. If the power button 113-1 is pressed (S303: YES), the power management unit 1026 performs the end process of the imaging device 1 (S304).

If the power button 113-1 is not pressed (S303: NO), the image processing unit 1023 confirms the press of the shutter button 113-2. If the shutter button 113-2 is pressed (S305: YES), the imaging unit 110 photographs the object to obtain image data (S306), and stores the obtained image data in the image temporary storage area 1032 of the RAM 103. At this time, additional information, such as the type of device by which the image was photographed, aperture value, number of pixels, ISO sensitivity, photographing date and time, and location information, is also stored into the image temporary storage area 1032. Then, the image data and the additional information that are stored in the image temporary storage area 1032 are stored in the storage unit 104 or the external recording medium 106 by the image recording unit 1024 (S307). Then, the image data, which is photographed by the imaging unit 110 and stored in the image temporary storage area 1032, is displayed on the display unit 112 (S309).

If the shutter button 113-2 is not pressed (S305: NO), the image reproduction unit 1025 confirms the press of the reproduction button 113-5. If the reproduction button 113-5 is pressed (S308: YES), the image data recorded in the storage unit 104 or the external recording medium 106 is reproduced by the image reproduction unit 1025 and then displayed on the display unit 112 (S309). The user can display the image to be reproduced and displayed by pressing the reproduction button 113-5. This image data displayed on the display unit 112, as well as the image data generated by photographing the object by the user and displayed on the display unit 112 (S306) correspond to first image data.

Figure 6A:
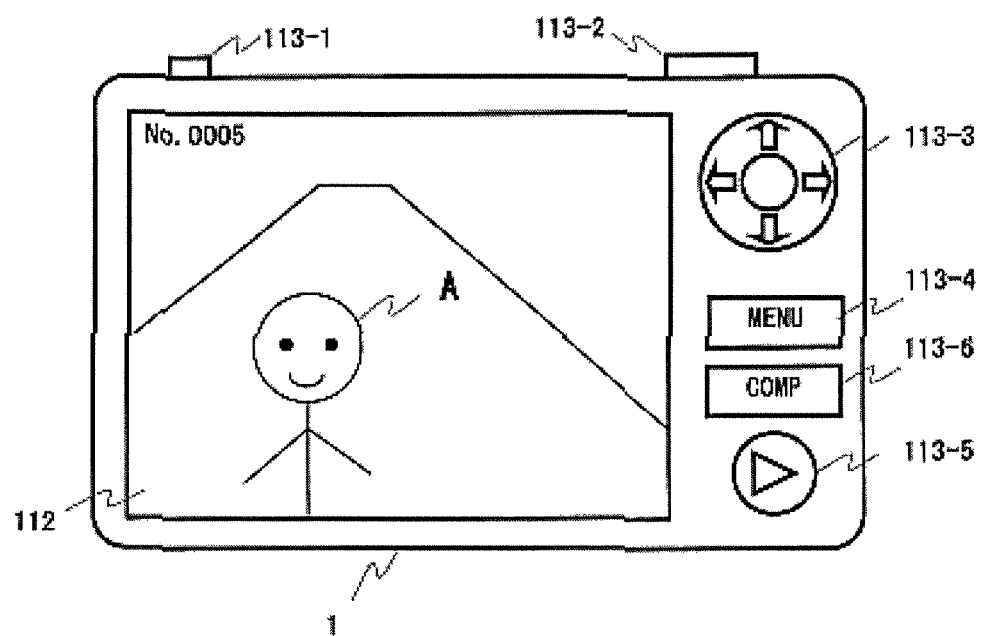
FIG. 6A is a view showing a display example of a display unit just after photographing by the imaging device according to the first embodiment.

FIG. 6A is a view showing a display example of the display unit 112 just after photographing by the imaging device 1. A person A is photographed with a mountain in the background. The display time of the photographed image data is, for example, about 3 seconds, which may be changed by the user. When a predetermined time interval has elapsed, the display of the image data disappears. However, the image data is displayed again when the reproduction button 113-5 is pressed.

If the reproduction button 113-5 is not pressed (S308: NO), the composition processing unit 1027 confirms the press of the composition button 113-6. If the composition button 113-6 is pressed (S312: YES), the image data obtained by photographing the object by the imaging unit 110 and then recorded in the storage unit 104 or the external recording medium 106 through the image temporary storage area 1032 is composed by the composition processing unit 1027 (S313). Then, the composed image data is displayed on the display unit 112 (S315).

Figure 6B:
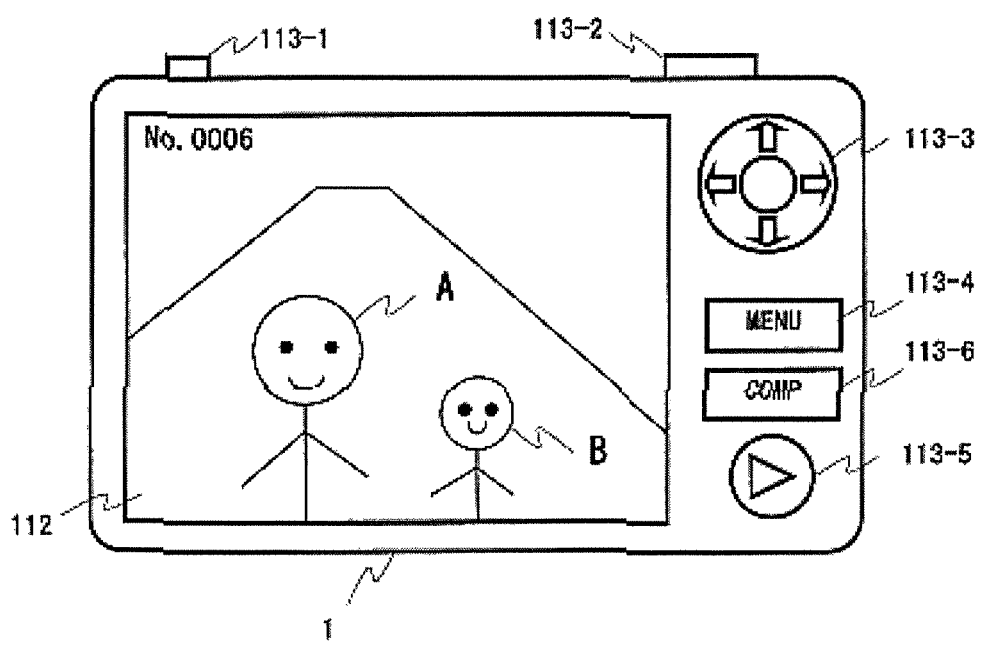
FIG. 6B is a view showing a display example of the image data composed by the imaging device according to the first embodiment.

FIG. 6B is a view showing a display example of the image data composed by the imaging device 1. The image including the person A photographed with the mountain in the background is composed with a person B photographed with the same mountain in the background.

When selection and determination to record the composed image data into the storage unit 104 or the external recording medium 106 is made by the select/determine operation button 113-3 (S317: YES), the image recording unit 1024 records the image data composed by the composition processing unit 1027 into the storage unit 104 or the external recording medium 106 (S318).

Figure 7:
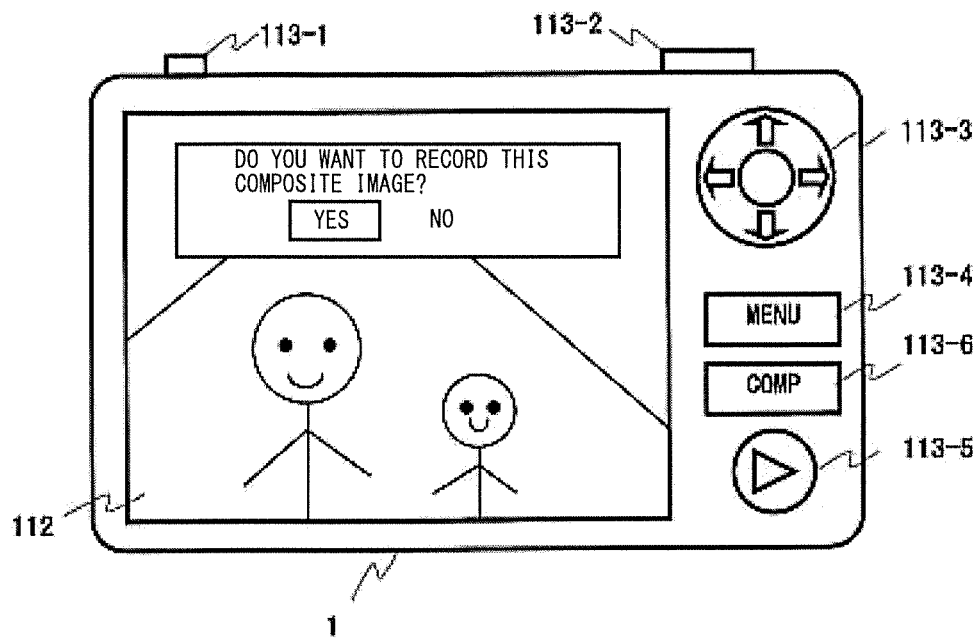
FIG. 7A is a view showing a display example of a selection screen for selecting whether or not to record the image data composed by the imaging device according to the first embodiment.
FIG. 7B is a view showing a display example when the image is not composed by the imaging device according to the first embodiment.
Figure 7:
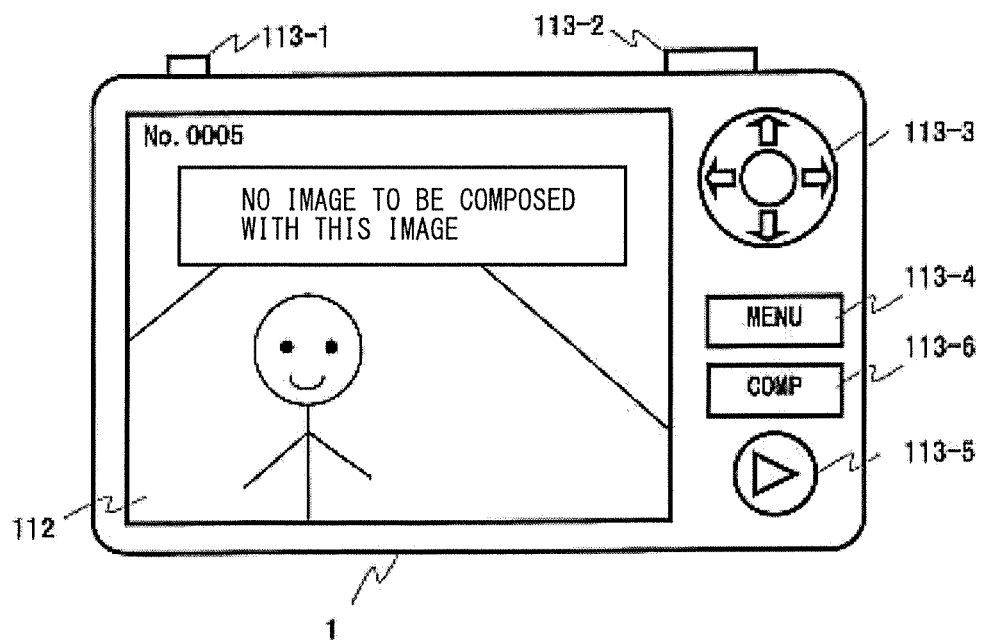

FIG. 7A is a view showing a display example of the selection screen for selecting whether or not to record the image data composed by the imaging device 1. The user selects and determines "YES" or "NO" by the select/determine operation button 113-3.

If selection and determination to avoid recording the composite image data in the storage unit 104 or the external recording medium 106 is made by the select/determine operation button 113-3 (S317: NO) or if the composition button is not pressed (S312: NO), the operation returns to Step S303 after the image reproduction process (S315), or after the image reproduction process (S309).

FIG. 7B is a view showing a display example when the image is not composed. If the image is not composed (if the composition failed as a result of the image composition process in S313), the image shown in FIG. 7B is displayed on the display unit 112, instead of the image shown in FIG. 7A.

By performing the above described process from steps S301 to S318, the imaging device 1 records, reproduces, and composes the images.

Note that it may be possible to select the composition process by the menu button 113-4 and the select/determine operation button 113-3, instead of using the independent composition button 113-6, when performing the composition process. Further, it may also be possible to register an important person in advance to automatically perform the composition operation when the registered person is photographed. Further, when the user takes a picture by touching an object displayed on the display unit 112 with a touch sensor, instead of pressing down the shutter button 113-2, and if the object is a person, the particular person may also be registered as an important person. Furthermore, when the photographed person is displaced from the center of the image by a predetermined value or more, or by a predetermined ratio or more, for example, when the photographed person is displaced from the center by 20% or more, the imaging device 1 may automatically perform the composition operation.

Figure 4:
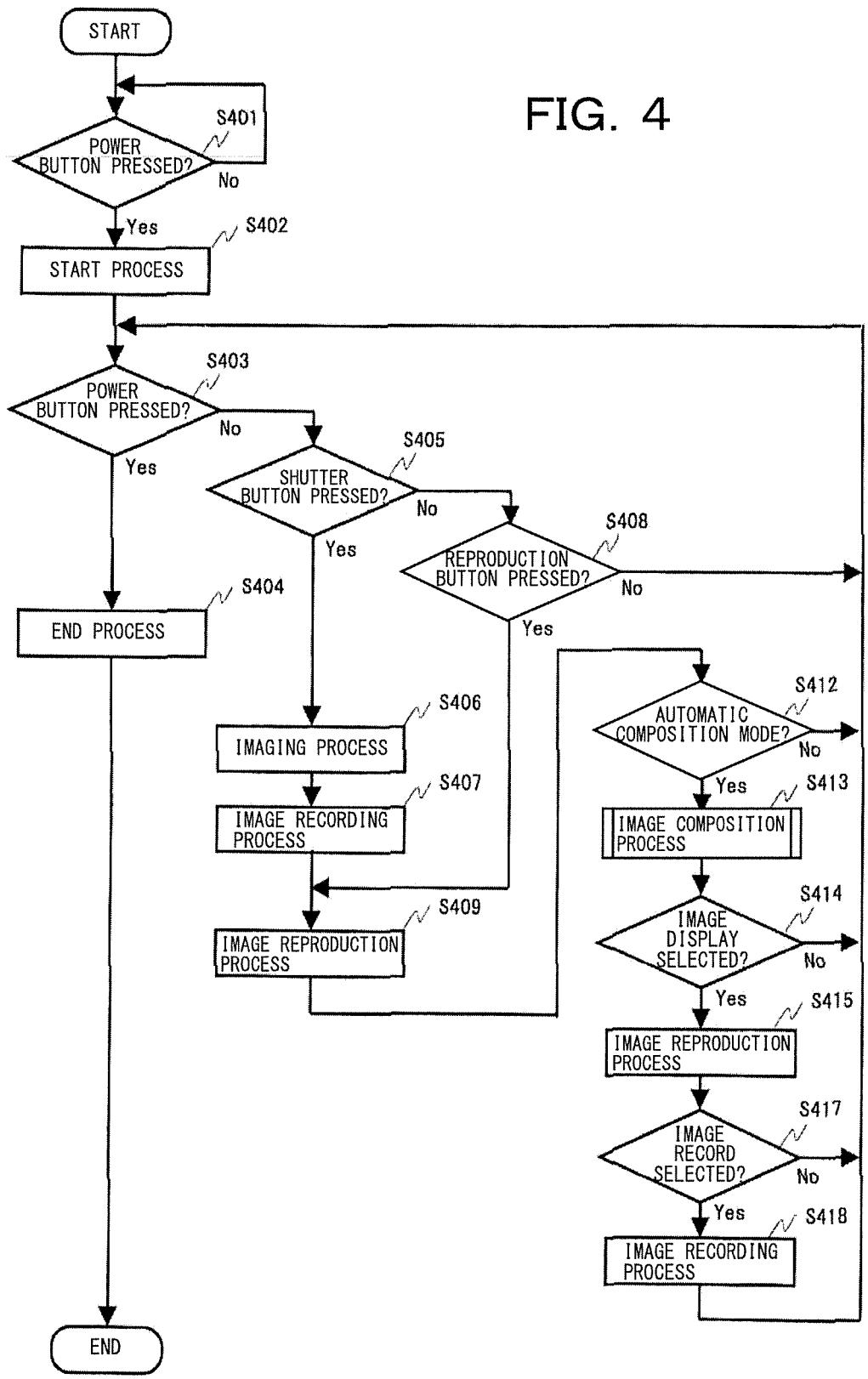
FIG. 4 is a flow chart showing another operation example (automatic composition mode) of the imaging device according to the first embodiment.

Next, with reference to FIG. 4, a description will be given of the image composition process in a so-called automatic composition mode to automatically perform the composition process when a person is photographed. FIG. 4 is a flow chart showing another operation example (automatic composition mode) of the imaging device 1 according to the first embodiment.

Of the steps, S401 to S409 in FIG. 4 are the same as S301 to S309 in FIG. 3, so that the description thereof is omitted.

The composition processing unit 1027 confirms whether or not the automatic composition mode is set (S412). The automatic composition mode is set in advance by the menu button 113-4 and the select/determine operation button 113-3. For this reason, the menu button 113-4 and the select/determine operation button 113-3 correspond to the mode setting unit.

In the case of the automatic composition mode (S412: YES), the composition processing unit 1027 composes the image data that is photographed by the imaging unit 110 and then recorded in the storage unit 104 or the external recording medium 106 through the image temporary storage area 1032 (S413). The composition processing unit 1027 performs the composition process in the image temporary storage area 1032.

The display unit 112 displays a screen for selecting the presence or absence of the display of the composed image data. The user makes a selection and determination of whether the composed image data is displayed, by the select/determine operation button 113-3 (S414: YES).

Figure 8:
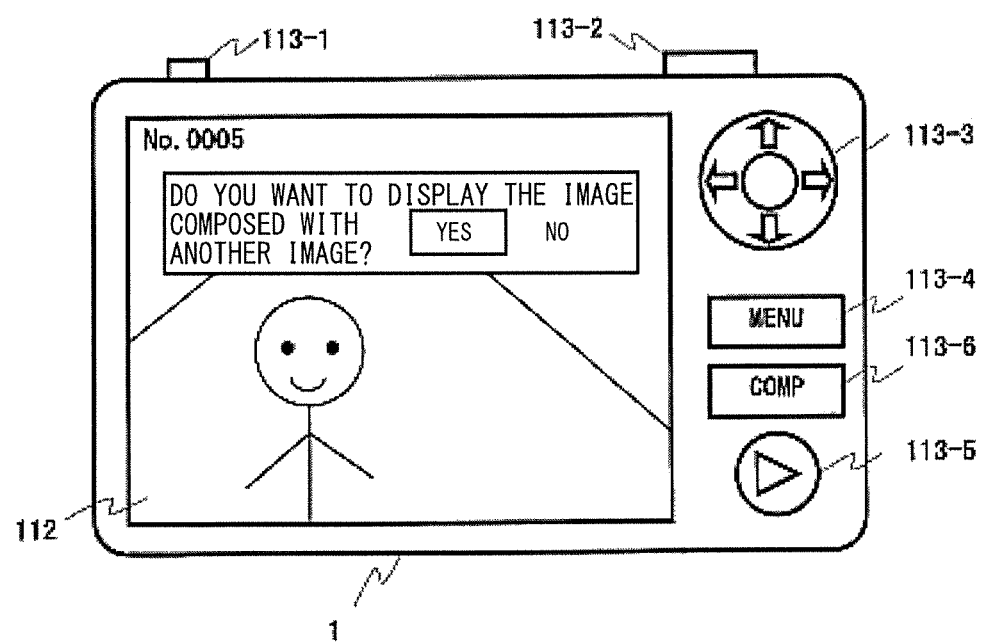
FIG. 8 is a view showing a display example of a selection screen for selecting whether or to display the image data composed with another image by the imaging device according to the first embodiment.

FIG. 8 is a view showing a display example of the selection screen for selecting whether the image data composed with another image by the imaging device 1 is displayed or not. The user selects and determines "YES" or "NO" with the select/determine operation button 113-3. If unable to compose the image data with another image data, the display unit 112 does not display the selection screen.

Because S415 to 418 are the same as S315 to S318 in FIG. 3, the description thereof is omitted.

If the automatic composition mode is not set (S412: NO), or if the composed image data is not displayed (S414: NO), the operation returns to S403.

By performing the above described process from S401 to S418, the imaging device 1 records, reproduces, and composes the images in the automatic composition mode.

[Image Composition Process]

Next, the image composition process in S313 and S411 will be described.

Figure 5:
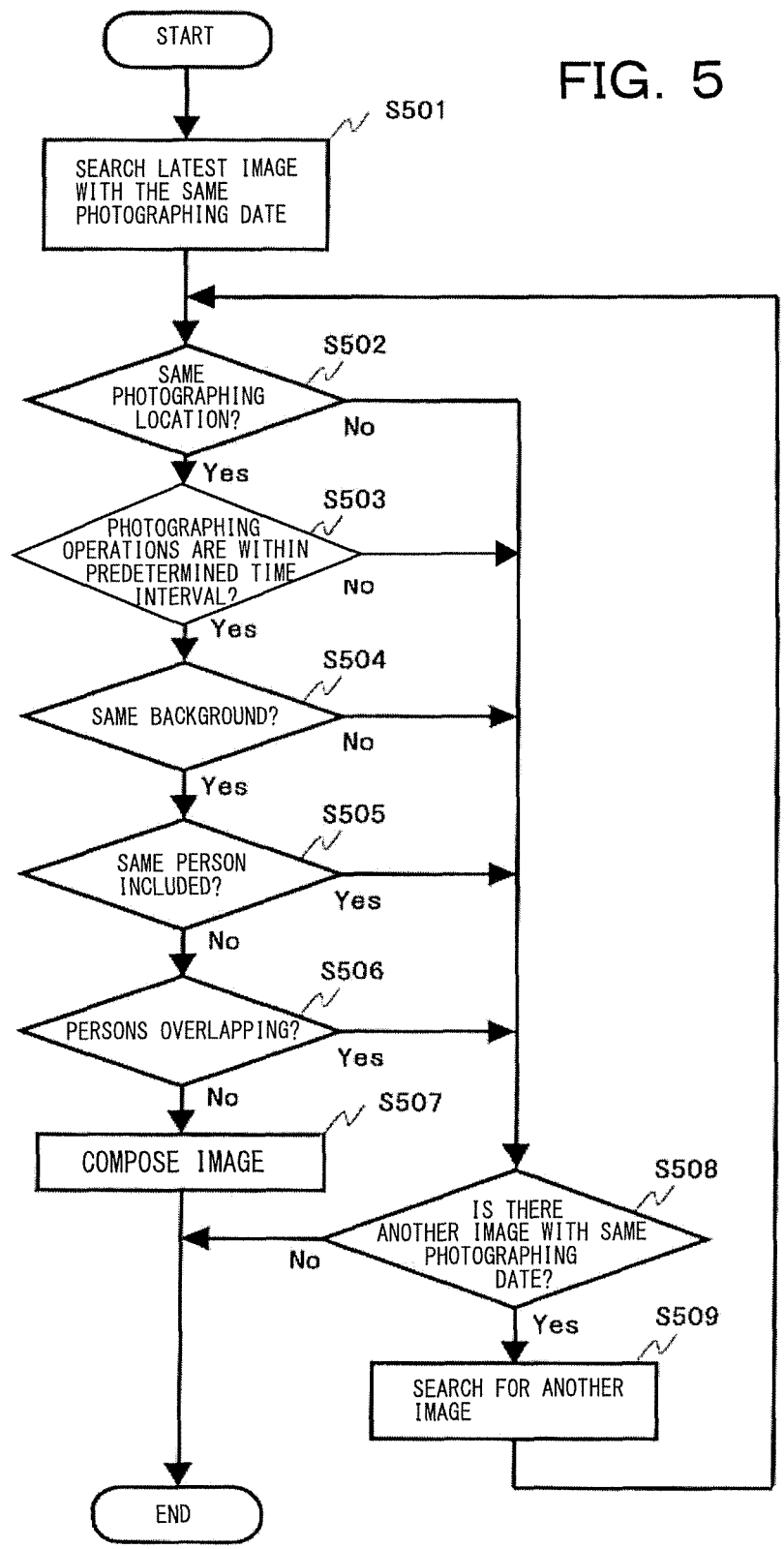
FIG. 5 is a flow chart showing an operation example of a composition processing unit according to the first embodiment.

FIG. 5 is a flow chart showing an operation example of the composition processing unit 1027.

The composition processing unit 1027 searches for the latest image with the same photographing date as that of the image displayed on the display unit 112, among the image data stored in the image storage area 1042 of the storage unit 104 or outside the external recording medium 106 (S501). Hereinafter, the searched image is referred to as the "search image", and the image displayed on the display unit 112 is referred to as the "display image".

The composition processing unit 1027 confirms whether or not the photographing location of the search image is the same as the photographing location of the display image based on the location information obtained by the location information acquisition unit 1022 (S502).

If the photographing locations are the same (S502: YES), the composition processing unit 1027 confirms whether or not the photographing date and time of the search image and the photographing date and time of the display image are within a predetermined time interval (S503). The predetermined time interval is, for example, about 3 minutes, which may be changed by the user.

If the photographing dates and times are within the predetermined time interval (S503: YES), the composition processing unit 1027 confirms whether or not the background of the search image is the same as the background of the display image by pattern matching (S504).

If the backgrounds are the same (S504: YES), the face recognition processing unit 1028 confirms whether or not the person included in the display image is the same as the person included in the search image (S505).

If the same person is not included (S505: NO), the composition processing unit 1027 confirms whether or not the location of the person photographed in the display image overlaps the location of the person extracted from the search image so as to be composed with the display image, within the display image when the search image and the display image are superimposed (S506). The determination level may be set in such a way that the answer is YES if the persons slightly overlap each other, or YES only if the faces overlap each other.

If the photographing location is the same in both the search image and the display image (S502: YES), and if the photographing dates and times are within the predetermined time interval (S503: YES), and if the backgrounds are the same (S504: YES), and if the same person is not included (S505: NO), and if the positions of persons do not overlap (S506: NO), the composition processing unit 1027 extracts the person of the search image through contour detection, and attaches the extracted person to the display image to compose with the display image (S507). Alternatively, the composition processing unit 1027 extracts the person of the display image through contour detection and attaches the extracted person to the search image to compose with the search image.

If the photographing locations of the search image and the display image are not the same (S502: NO), or if the photographing dates and times are not within the predetermined time interval (S503: NO), or if the backgrounds are not the same (S504: NO), or if the same person is included (S505: YES), or if the persons are overlapping (S506: YES), the composition processing unit 1027 confirms whether or not there is another image of the same photographing date (S508).

If another image is present (S508: YES), the composition processing unit 1027 searches for the next new image (S509) and returns to S502 to continue the process. If another image is not present (S508: NO), the composition processing unit 1027 ends the process. Note that the order of S502 and S503 can be changed and these steps correspond to the process of searching for a candidate of the second image data.

By performing the above described process from S501 to S509, the composition processing unit 1027 searches for an image to be attached to the display image, extracts the person from the searched image, and composes the extracted person.

Further, by providing a geomagnetic sensor in the imaging device, whether or not the orientations of the imaging device are the same, may also be added as a condition to the above described determination.

Further, when the imaging device has no GPS, the composition process may be performed by omitting S502.

Figure 9:
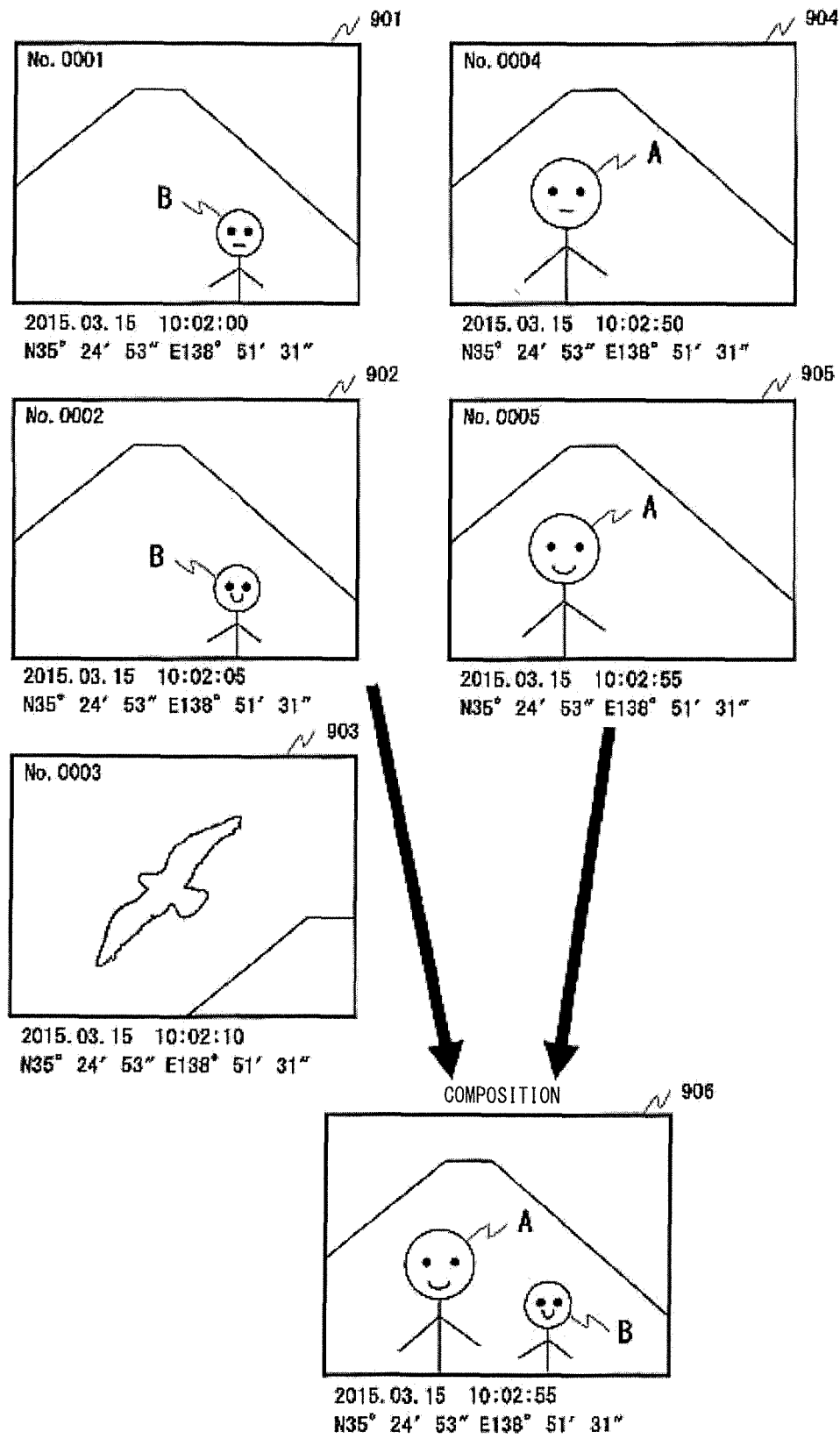
FIG. 9 is an illustrative example of the search and composition of image data according to the first embodiment.

FIG. 9 is an illustrative example of the search and composition of image data according to the first embodiment.

Image data 901 to 905 are image data that are photographed in series at 35° 24'53" North Latitude and 138° 51'31" East Longitude from 10:02:00 to 10:02:55 on 2015 Mar. 15. The background is the same in the image data 901, 902, 904, and 905. The background is different only in the image data 903.

The date and time information is obtained by the timer unit 114, and the location information is obtained by the GPS receiver 115.

The image data 901 and 902 are image data of the person B photographed by the person A, and the image data 903 is image data of a bird photographed by the person A or B. The image data 904 and 905 are image data of the person A photographed by the person B.

In general, the user repeats photographing operation until satisfactory image data is obtained. It is shown that, although both the image data 901 and 902 are image data of the person B photographed by the person A, the image data 902 is re-photographed by the person A because the person B of the image data 901 is not smiling. Similarly, it is shown that, although both the image data 904 and 905 are image data of the person A photographed by the person B, the image data 905 is re-photographed by the person B because the person A of the image data 904 is not smiling. Further, the image data 903 shows that the bird suddenly appearing during a series of photographing operations (representing the period of time in which the image data 901 to 905 are photographed) is photographed.

When the shutter button 113-2 of the imaging device 1 is pressed, the imaging device 1 photographs an object and displays the photographed image on the display unit 112. Then, the imaging device 1 composes the image when the composition button 113-6 is pressed.

The image data 906 is the image data composed from the image data 902 and 905.

The above described FIG. 6A is a display example of the display unit 112 just after the photographing of the image data 905 by the imaging device 1, or after the reproduction button 113-5 is pressed after the photographing. Here, when the composition button 113-6 of the imaging device 1 is pressed, the imaging device 1 searches for the image data 903 according to the flow chart of FIG. 5, and generates the image data 906 by compositing the image data 902 and 905. FIG. 6B is a display example of the image data 906 composed by the imaging device 1.

The image data 901 to 904 are image data with the same photographing location as the photographing location of the image data 905 (S502: YES), and their photographing dates and times are within the predetermined time interval (S503: YES). The image data 904 includes the same person as the person of the image data 905 (S505: YES). The background of the image data 903 is different from the image data 905 (S504: NO). The image data 901 and 902 have the same background as the image data 905 (S504: YES), in which the same person is not included (S505: NO), and the persons do not overlap (S506: NO). Of these image data, the imaging device 1 selects the image data 902 as the latest image data, and composes the image data 902 with the image data 905 to generate the composite image data 906. In the example of FIG. 9, the image data 905 corresponds to the first image data and the image data 902 corresponds to the second image data. The image data 903 is excluded because the background is different from the background of the image data 905. If the imaging device 1 includes a lens having a zoom function, it may be possible to exclude image data with a lens focal length different by a predetermined value or more.

Note that the deviation of view angle of each image data can be absorbed by performing the composition with reference to the background. For example, one method is to extract the person B of the image data 902 through contour detection to attach the extracted person B to the image data 905 with reference to the background. Another possible method is to extract the person A of the image data 905 through contour detection to compose the extracted person A with the image data 902 with reference to the background.

Figure 10:
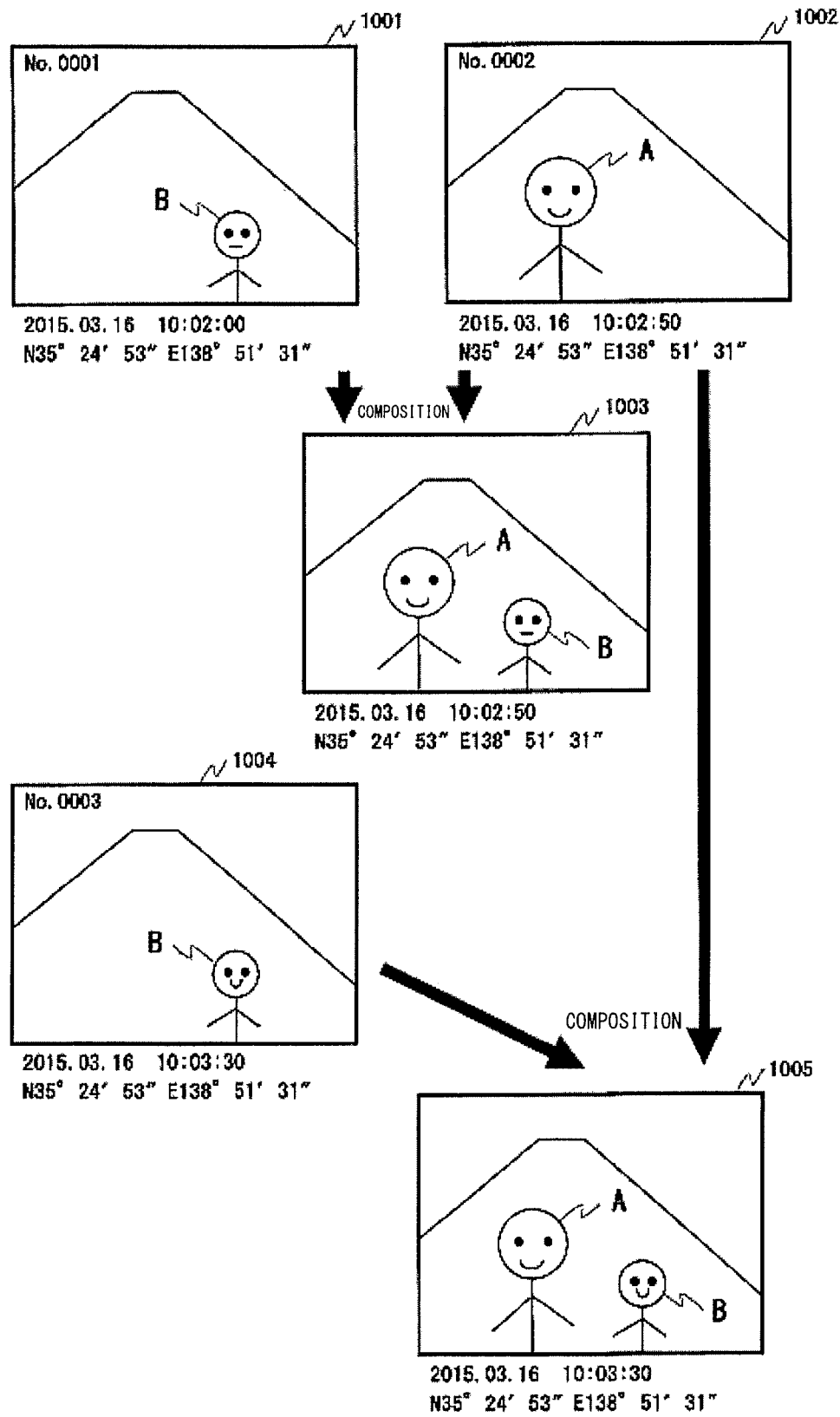
FIG. 10 is an illustrative example of the search and composition of image data according to the first embodiment.

FIG. 10 is an illustrative example of the search and composition of image data according to the first embodiment.

Image data 1001 and 1002 are image data that are photographed in series at 35° 24'53" North Latitude and 138° 51'31" East Longitude from 10:02:00 to 10:02:50 on 2015 Mar. 16. The background is the same in the image data 1001 and 1002.

The image data 1001 is the image data of the person B photographed by the person A. The image data 1002 is the image data of the person A photographed by the person B.

When the composition button 113-6 of the imaging device 1 is pressed after the image data 1002 is photographed, the imaging device 1 composes the image. Alternatively, the imaging device 1 automatically composes the image after photographing in the automatic composition mode.

The composite image data 1003 is the image data composed from the image data 1001 and 1002.

The image data 1004 is the image of the person B re-photographed by the person A, after recording the composite image data 1003 in the storage unit 104 or the external recording medium 106 or without recording it. It is shown that while both the image data 1001 and 1004 are the image data of the person B photographed by the person A, the image data 1004 is re-photographed by the person A because the person B of the image data 901 is not smiling. It is also possible that the person B re-photographs the person A.

The imaging device 1 composes the images again when the composition button 113-6 of the imaging device 1 is pressed after photographing the image data 1004. Alternatively, the imaging device 1 automatically composes again the image after photographing in the automatic composition mode.

The image data 1005 is the image data composed from the image data 1002 and 1004.

It is possible to further re-photograph the image to obtain a desired composite image by repeating photographing and composition many times.

As described above, according to the present embodiment, when the composition button is pressed after the image to be composed is photographed, the imaging device can compose the image by searching for the optimal image. Alternatively, the imaging device can automatically search for the optimal image and compose the image after photographing.

The number of images to be composed is unlimited, and the imaging device searches for the optimal image for composition from the photographed images. Further, a plurality of images to be composed can be treated as targets for composition, as long as the images have the same background, regardless of their photographing timing. Thus, also in the case when only one image is re-photographed or when an image that is not a target for composition is photographed during the photographing timing of the image to be composed, it is possible to perform the composition process by eliminating the image not to be composed. Further, it is possible to obtain a desired composite image by repeating the photographing and composition operation many times. This makes it possible to increase the operability for photographing a composite image in such a way that a plurality of persons is present together in one image. Note that while the present embodiment has descried the example of selecting a newer image as a priority, it is also possible to select an image including a smiling person or a full-faced person as a priority.

Second Embodiment

A second embodiment is to perform composition by using the image data selected by the user.

[Entire Operation of the Imaging Device]

Figure 11:
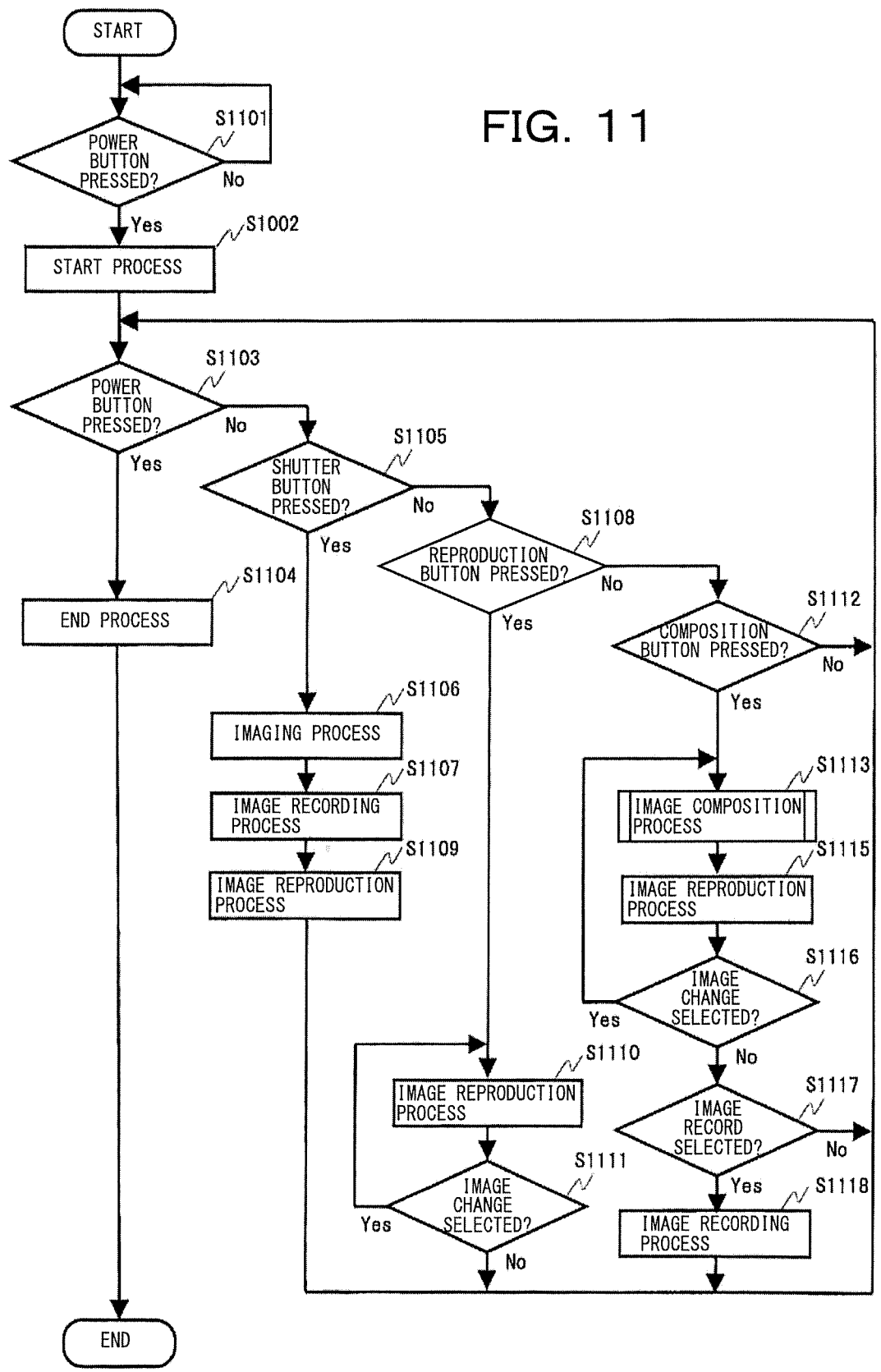
FIG. 11 is a flow chart showing an entire operation example of the imaging device according to a second embodiment.

FIG. 11 is a flow chart showing the entire operation of an imaging device according to the second embodiment.

Of the steps, S1101 to S1018 are the same as S301 to S308 in FIG. 3, so that the description thereof will be omitted.

Image data photographed by the imaging unit 110 and stored in the image temporary storage area 1032 is displayed on the display unit 112 (S1109).

When the reproduction button 113-5 is pressed (S1108: YES) and when change of image is selected through the select/determine operation button 113-3 (S1111: YES), the imaging device 1 reproduces the image data recorded in the storage unit 104 or the external recording medium 106 by the image reproduction unit 1025, and displays the reproduced image data on the display unit 112 (S1110). Here, the select/determine operation button 113-3 functions as an operation member to select the image stored in the storage unit 104. Thus, the select/determine operation button 113-3 corresponds to the selection operation unit.

Figure 13A:
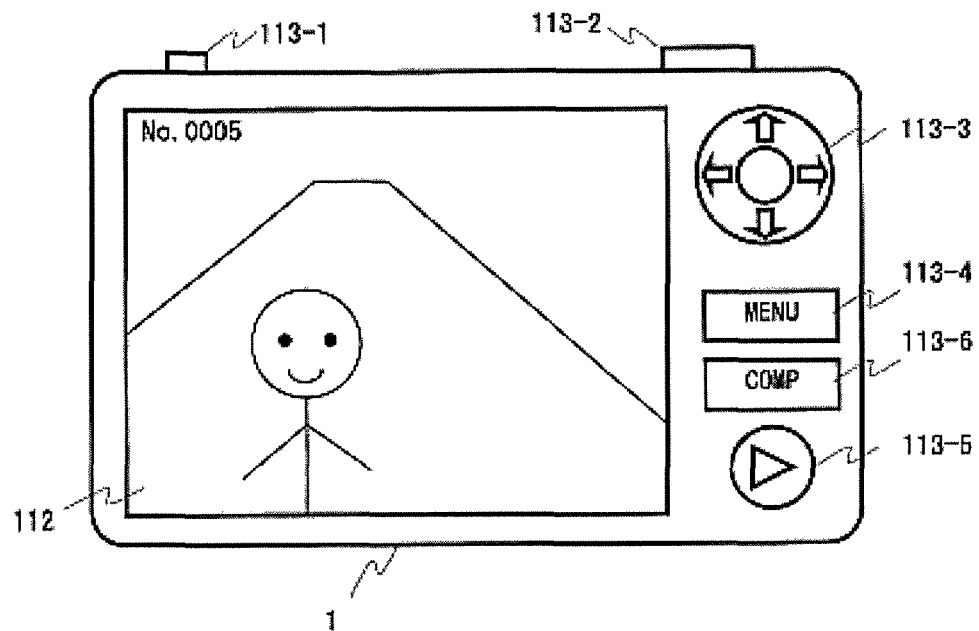
FIG. 13A is a view showing a display example of the display unit when a reproduction button is pressed in the imaging device according to the second embodiment.

FIG. 13A is a view showing a display example of the display unit 112 when the reproduction button 113-5 is pressed.

When the user selects whether to change the image data to be displayed on the display unit 112 into another image data by the select/determine operation button 113-3, the image data displayed on the display unit 112 is changed to another image data (S1111: YES).

Figure 13B:
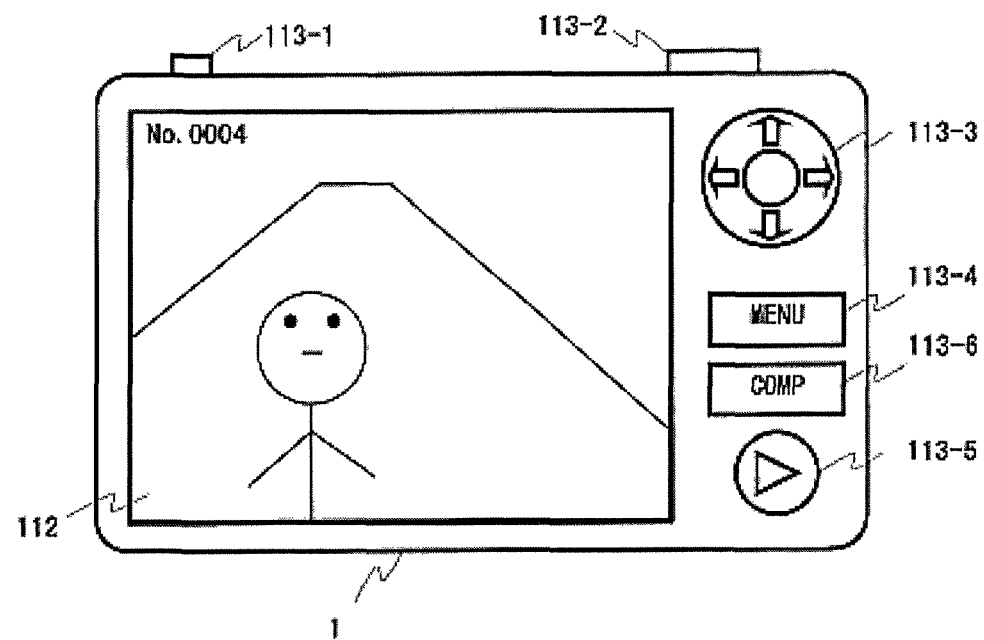
FIG. 13B is a view showing a display example of the display unit when the image data is changed to another image data in the imaging device according to the second embodiment.

FIG. 13B is a view showing a display example of the display unit 112 in the imaging device 1 when the display image data is changed to another image data.

Because S1112 is the same as S312 in FIG. 3, the description thereof will be omitted.

When the composition button 113-6 is pressed (S1112: YES) and when change of image is selected through the select/determine operation button 113-3 (S1116: YES), the imaging device 1 composes the image data recorded in the storage unit 104 or the external recording medium 106 by the composition processing unit 1027 (S1113: YES). The composition is performed in the image temporary storage area 1032.

Because S1115 is the same as S315 in FIG. 3, the description thereof will be omitted.

Figure 14:
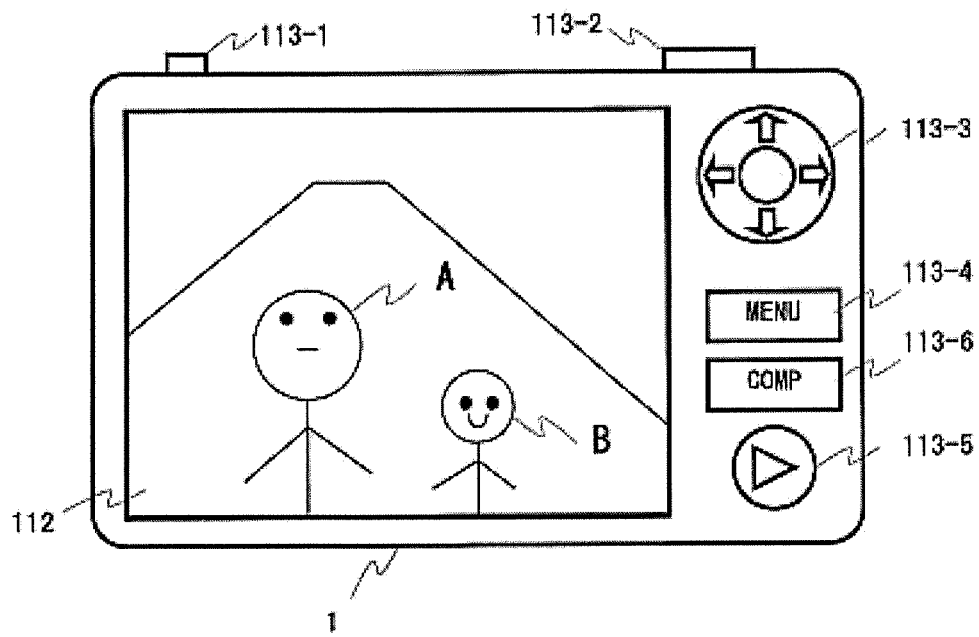
FIG. 14A is a view showing a display example of the display unit when a composition button is pressed in the imaging device according to the second embodiment.
FIG. 14B is a view showing a display example of the display unit when the image data is changed to another image data in the imaging device according to the second embodiment.
Figure 14:
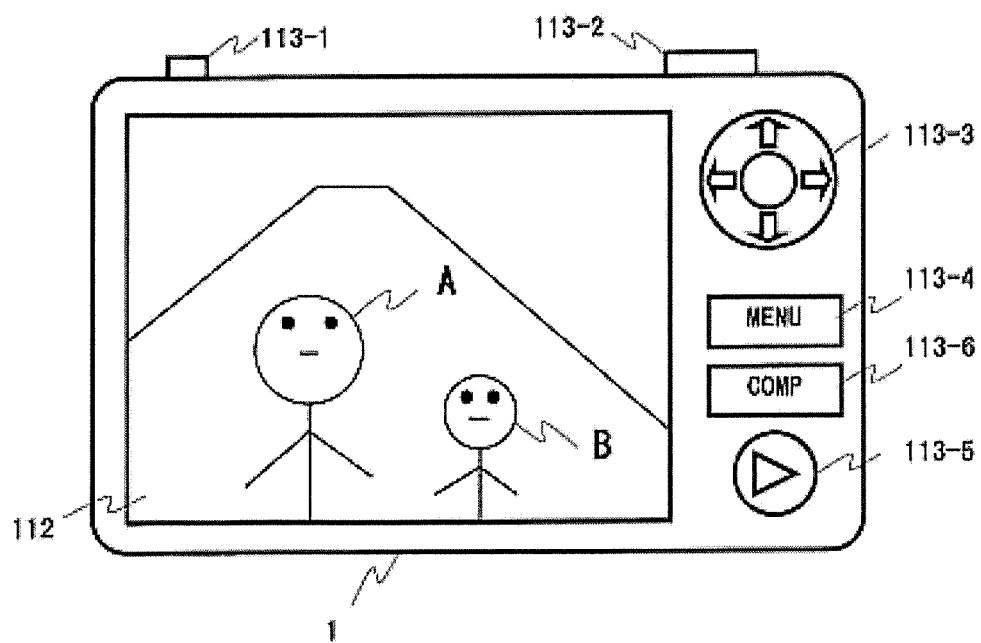

FIG. 14A shows a display example of the display unit 112 when the composition button 113-6 is pressed.

The user selects whether to change the image data to be composed into another image data through the select/determine operation button 113-3 (S1116).

FIG. 14B shows a display example of the display unit 112 in the imaging device 1 when the image data to be composed is changed to another image data. The imaging device 1 does not change image data 1404 that is selected in S1116, while changing image data 1401 to 1403 to be composed with the image data 1404.

Because S1117 to S1118 are the same as S317 to S318 in FIG. 3, the description thereof will be omitted.

By performing the above described process from S1101 to S1118, the imaging device 1 records, reproduces, and composes the images.

[Image Composition Process]

Next, the image composition process of S1113 will be described. FIG. 12 is a flow chart showing an operation example of a composition processing unit according to the second embodiment.

The composition processing unit confirms whether or not there is an image change instruction from the user (S1200).

When there is no image change instruction from the user (S1200: NO), the composition processing unit searches for the latest image with the same photographing date as the image displayed on the display unit (S1201).

Of the steps, S1202 to S1209 are the same as S502 to S509 in FIG. 5, so that the description thereof will be omitted.

If there is an image change instruction from the user (S1200: YES), or if the photographing locations of the search image and the display image are not the same (S1202: NO), or if the photographing dates and times are not within a predetermined time interval (S1203: NO), or if the backgrounds are not the same (S1204: NO), or if the same person is included (S1205: YES), or if the person to be composed overlaps (S1206: YES), the composition processing unit confirms whether or not there is another image with the same photographing date (S1208). If another image is present (S1208: YES), the composition processing unit searches for the next new image (S1209) and returns to S1202, and then continues the process. If another image is not present (S1208: NO), the composition processing unit ends the process.

By performing the above described process from S1200 to S1209, the composition processing unit searches for an image to be attached to the display image and composes the images.

Figure 15:
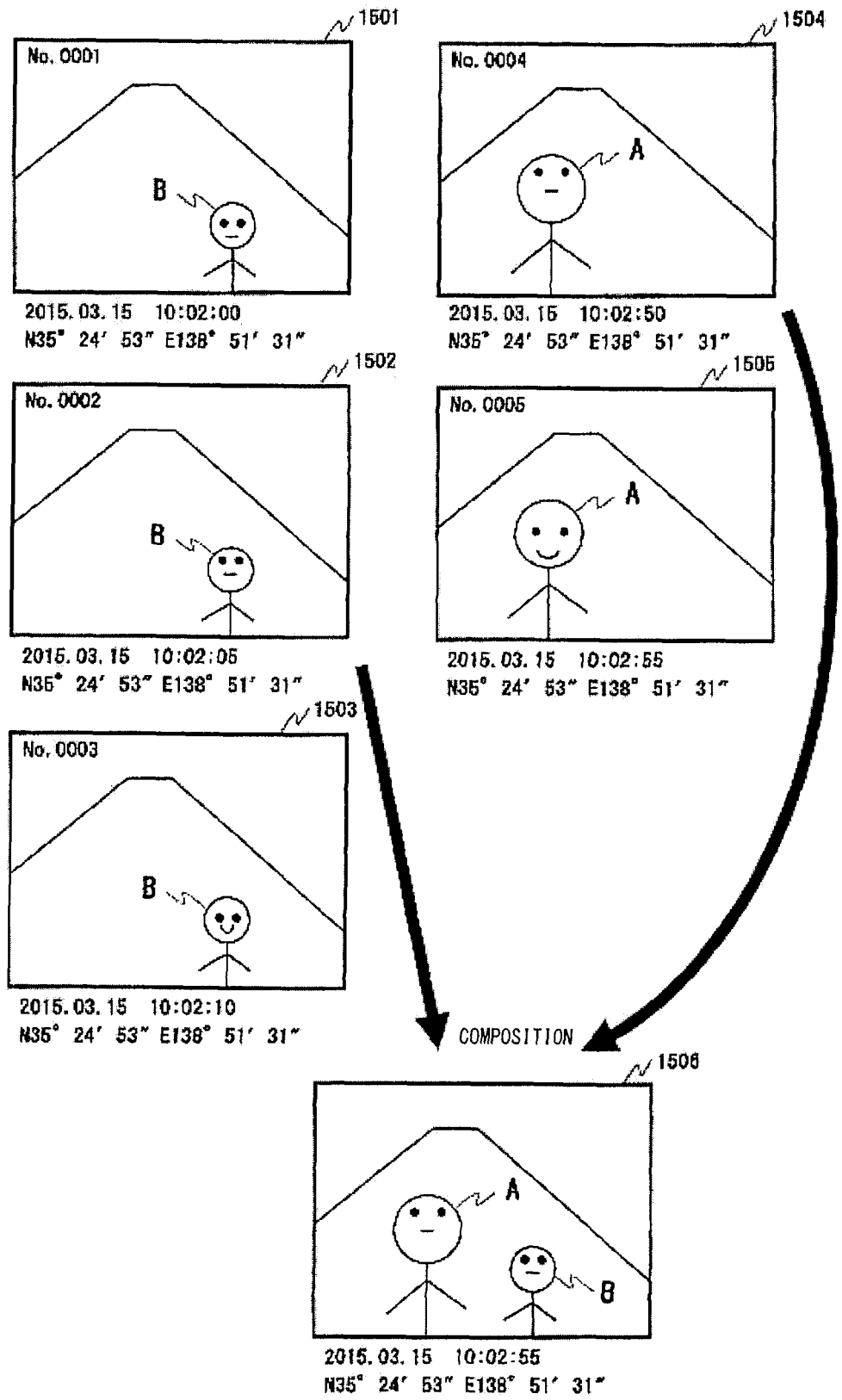
FIG. 15 is an illustrative example of the search and composition of image data according to the second embodiment.

FIG. 15 is an illustrative example of the search and composition of image data according to the second embodiment.

The image data 1501 to 1505 are image data that are photographed in series at 35° 24'53" North Latitude and 138° 51'31" East Longitude from 10:02:00 to 10:02:55 on 2015 Mar. 15. The background is the same in the image data 1501 to 1505. The image data 1501 to 1503 are the image data of the person B photographed by the person A. The image data 1504 and 1505 are the image data of the person A photographed by the person B.

When the shutter button 113-2 of the imaging device 1 is pressed, the imaging device 1 photographs an object, and displays the photographed image on the display unit 112. Then, the imaging device 1 composes the image when the composition button 113-6 is pressed.

Image data 1506 is image data that is composed from the image data 1502 and 1504.

As described above, according to the present embodiment, it is possible to obtain the same effect as the first embodiment. In addition, the user can freely select the image to be composed.

Third Embodiment

A third embodiment is to add only the registered person to the image after composition, while deleting the non-registered person from the image after composition.

[Entire Operation of the Imaging Device]

Figure 16:
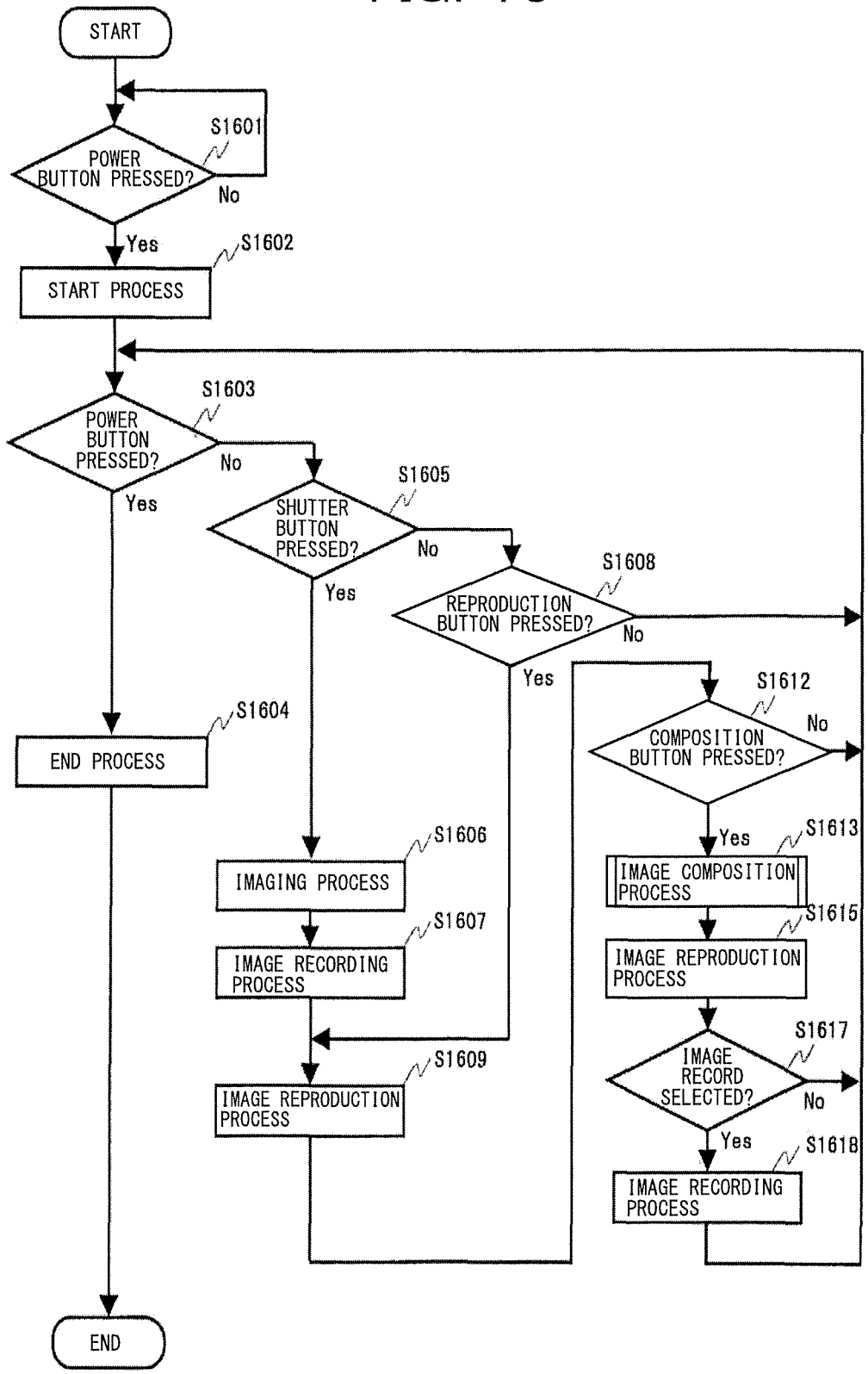
FIG. 16 is a flow chart showing an entire operation example of an image device according to a third embodiment.

FIG. 16 is a flow chart showing an entire operation example of the imaging device according to the third embodiment.

Of the steps, S1601 to S1612 are the same as S301 to S312 in FIG. 3, so that the description thereof will be omitted.

Figure 18:
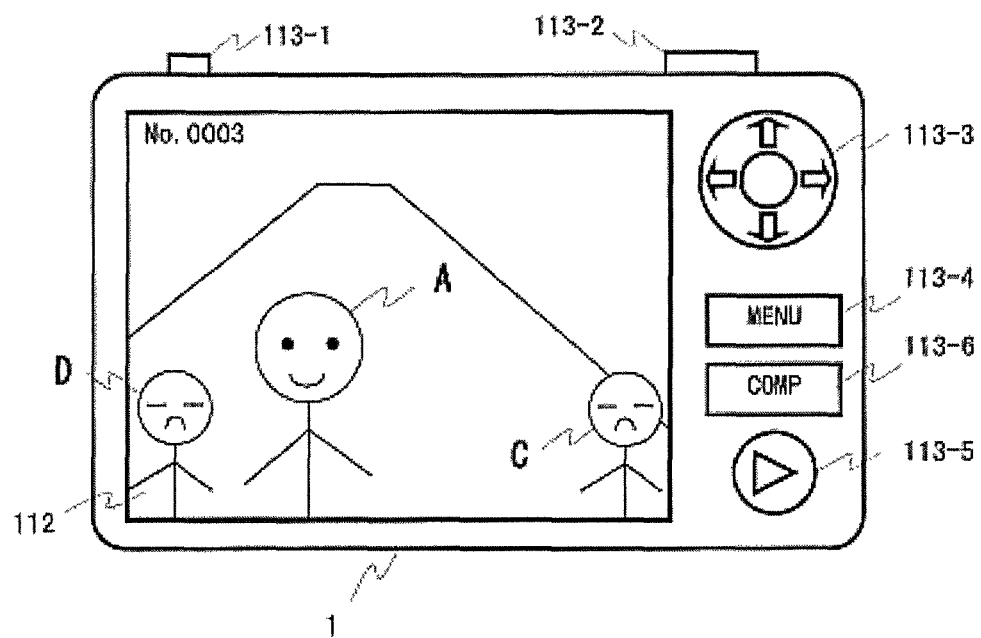
FIG. 18A is a view showing a display example of the display unit just after photographing or when the reproduction button is pressed in the imaging device according to the third embodiment.
FIG. 18B is a view showing a display example of the image data composed by the imaging device according to the third embodiment.
Figure 18:
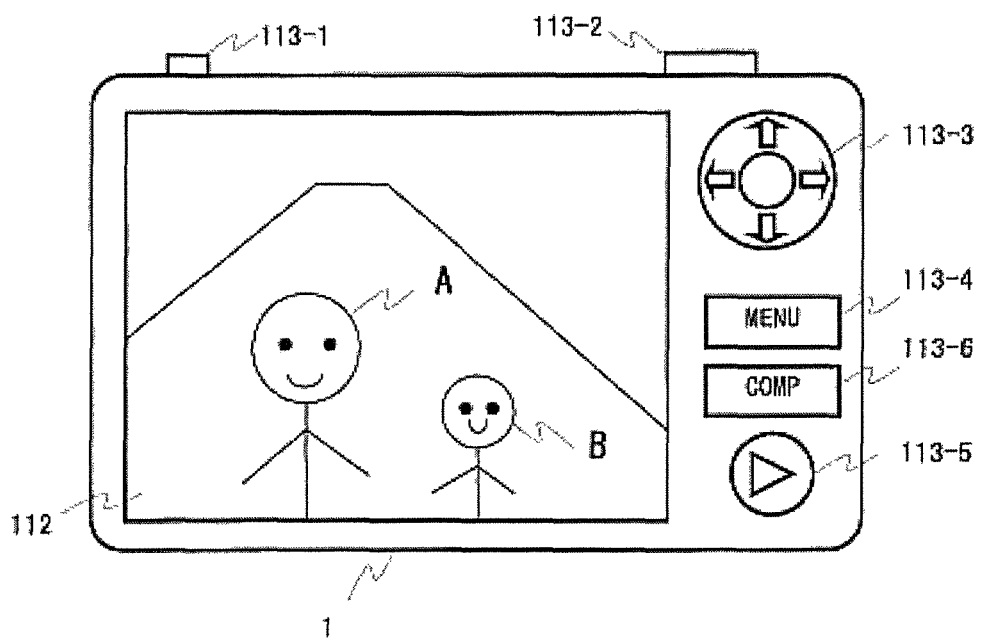

FIG. 18A is a view showing a display example of the display unit 112 just after photographing by the imaging device 1 or when the reproduction button 113-5 is pressed. The person A is photographed with a mountain in the background, in which non-registered persons C and D are also photographed. The persons A and B are registered in advance as important persons. Further, when the user photographs a person by touching the person displayed on the display unit 112 with a touch sensor instead of pressing down the shutter button 113-2, the particular person may also be registered as an important person.

If the composition button 113-6 is pressed (S1612: YES), the composition processing unit 1027 composes the image data photographed by the imaging unit 110 and stored in the image temporary storage area 1032, with the image data recorded in the storage unit 104 or the external recording medium 106 (S1613). The composition is performed in the image temporary storage area 1032. At this time, the registered person is added and the non-registered person is deleted by the composition.

FIG. 18B is a view showing a display example of the image data composed by the imaging device 1. The image including the person A photographed with a mountain in the background is composed with the person B photographed with the same mountain in the background. At the same time, the non-registered persons C and D are deleted.

Because S1615 to S1618 are the same as S315 to S318 in FIG. 3, the description thereof will be omitted.

By performing the above described process from S1601 to S1618, the imaging device 1 records, reproduces, and composes the images.

[Image Composition Process]

Next, the image composition process of S1613 will be described.

Figure 17:
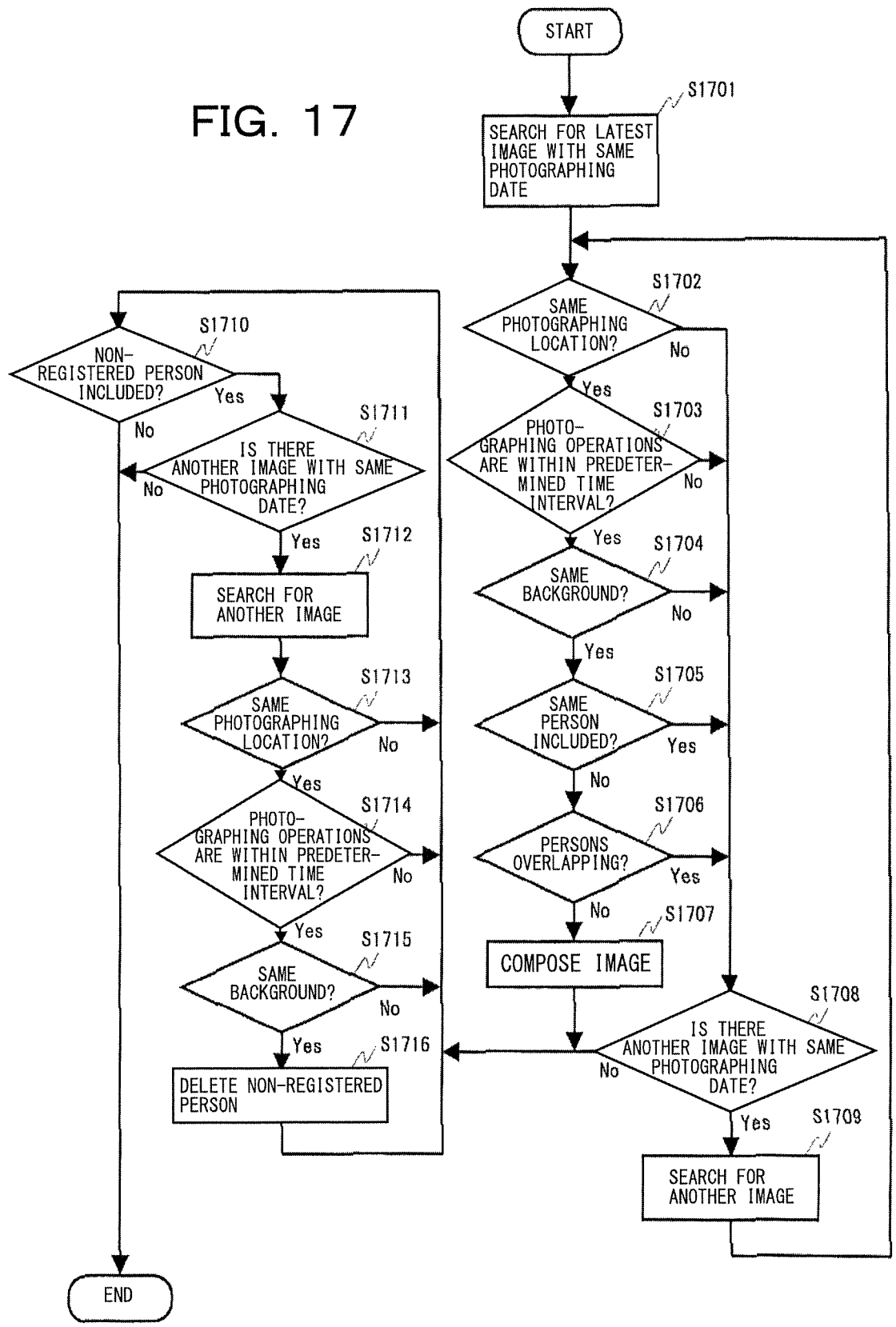
FIG. 17 is a flow chart showing an operation example of a composition processing unit according to the third embodiment.

FIG. 17 is a flow chart showing an operation example of a composition processing unit according to the third embodiment.

Of the steps, S1701 to S1706 are the same as S501 to S506 in FIG. 5, so that the description thereof will be omitted.

If the photographing locations of the search image and the display image are the same (S1702: YES), and if the photographing dates and times are within a predetermined time interval (S1703: YES), and if the backgrounds are the same (S1704: YES), and if the same person is not included (S1705: NO), and if the persons do not overlap (S1706: NO), the composition processing unit 1027 extracts the registered person of the search image through contour detection, and composes the extracted person by attaching to the display image. Alternatively, the composition processing unit 1027 extracts the registered person of the display image through contour detection, and composes the extracted person by attaching to the search image (S1707).

Further, the composition processing unit 1027 deletes the non-registered person by extracting the background of the search image at the position where the non-registered person of the display image is present, and by attaching the extracted background to the display image (or composes the background data). Alternatively, the composition processing unit 1027 deletes the non-registered person by extracting the background of the display image at the position where the non-registered person of the search image is present, and by attaching the extracted background to the search image.

Because S1708 to S1709 are the same as S508 to S509, the description thereof will be omitted.

After the composition of the image (S1707) or if another image with the same photographing date is not present (S1708: NO), the composition processing unit 1027 confirms whether or not there is a non-registered person present in the composed image data (S1710).

If a non-registered person is present in the composed image data (S1710: YES), the composition processing unit 1027 confirms whether or not there is another image (S1711).

If another image is present (S1711: YES), the composition processing unit 1027 searches and extracts another image (S1712). If another image is not present (S1711: NO), the composition processing unit 1027 ends the process.

The composition processing unit 1027 confirms whether or not the photographing location of the search image and the photographing location of the composed image are the same (S1713).

If the photographing locations are the same (S1713: YES), the composition processing unit 1027 confirms whether or not the photographing date and time of the search image and the photographing date and time of the composed image are within a predetermined time interval (S1714). The predetermined time interval is, for example, about 3 minutes, which may be changed by the user.

If the photographing dates and times are within the predetermined time interval (S1714: YES), the composition processing unit 1027 confirms whether or not the background of the search image and the background of the display image are the same (S1715).

If the backgrounds are the same (S1715: YES), the composition processing unit 1027 deletes the non-registered person (S1716), and returns to S1710.

If the non-registered person is not included (S1710: NO), or if another image of the same photographing date is not present (S1711: NO), the composition processing unit 1027 ends the process.

By performing the above described process from S1700 to S1716, the composition processing unit 1027 searches for the image to be attached to the display image, extracts the registered person, and composes the extracted registered person, while deleting the non-registered person.

Figure 19:
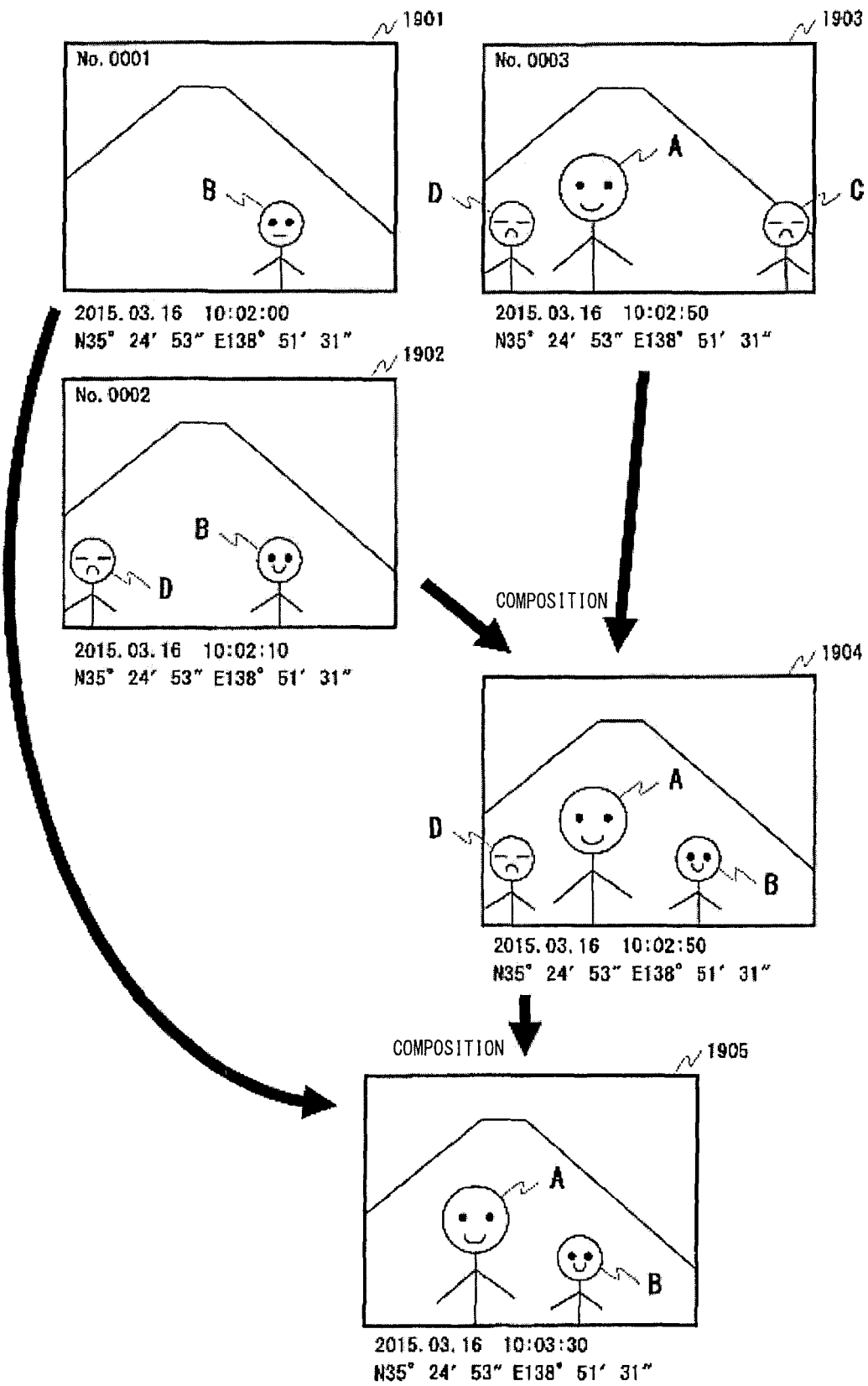
FIG. 19 is an illustrative example of the search and composition of image data according to the third embodiment.

FIG. 19 is an illustrative example of the search and composition of the image data.

Image data 1901 to 1903 are image data that are photographed in series at 35° 24'53" North Latitude and 138° 51'31" East Longitude from 10:02:00 to 10:02:50 on 2015 Mar. 16. The background is the same in the image data 1901 to 1903.

The image data 1901 and 1902 are the image data of the person B photographed by the person A, in which the non-registered person D is also photographed in the image data 1902. It is shown that the image data 1902 is re-photographed by the person A because the person B of the image data 1901 is not smiling. The image data 1903 is the image data of the person A photographed by the person B, in which the non-registered persons C and D are also photographed. The persons A and B are registered in advance as important persons. It is also possible that when the user photographs a person by touching the person displayed on the display unit 112 with a touch sensor instead of pressing down the shutter button 113-2, the particular person may also be registered as an important person.

When the shutter button 113-2 of the imaging device 1 is pressed, the imaging device 1 photographs an object and displays the photographed image on the display unit 112. Then, the imaging device 1 composes the image when the composition button 113-6 is pressed.

The image data 1904 is the image data obtained by compositing the registered persons from the image data 1902 and 1903, and by deleting the non-registered person C.

For example, the composition processing unit 1027 extracts the person B of the image data 1902 through contour detection, and attaches the person B to the image data 1903 with reference to the background, to compose the person B with the image data 1902. Further, the composition processing unit 1027 can delete the non-registered person C by attaching the background of the image data 1902 at the position where the non-registered person C of the image data 1903 is present, to the non-registered person C of the image data 1903. It is also possible that the composition processing unit 1027 extracts the person A of the image data 1903 through contour detection, and composes the person A with the image data 1902 with reference to the background to generate the image data 1904 after composition. If a non-registered person is present in either one or both of the two image data, the composition processing unit 1027 can extract a registered person from the image data with larger number of non-registered persons, and to attach the extracted registered person to the image data with smaller number of registered persons.

Next, the composition processing unit 1027 deletes the non-registered person D by attaching the background of the image data 1901 at the position where the non-registered person D of the image data 1904 is present, to the non-registered person D of the image data 1904.

The image data 1905 is the image data obtained by deleting the non-registered person D from the image data 1904 and 1901.

As described above, according to the present embodiment, it is possible to obtain the same effect as the first embodiment. In addition, it is possible to add only the registered person to the image and to delete the non-registered person. Note that while the present embodiment has described the example of adding the registered person to the image and deleting the non-registered person, it is also possible to delete the non-registered person without adding the registered person to the image.

Fourth Embodiment

A fourth embodiment is to search for the background image when photographing the image with only the background in which no person is photographed (hereinafter referred to as the "background image"), and when there is no background image, search for image data of photographed backgrounds publicly available on the network, while deleting a non-registered person by using these backgrounds.

[Hardware Configuration of the Imaging Device]

Figure 20:
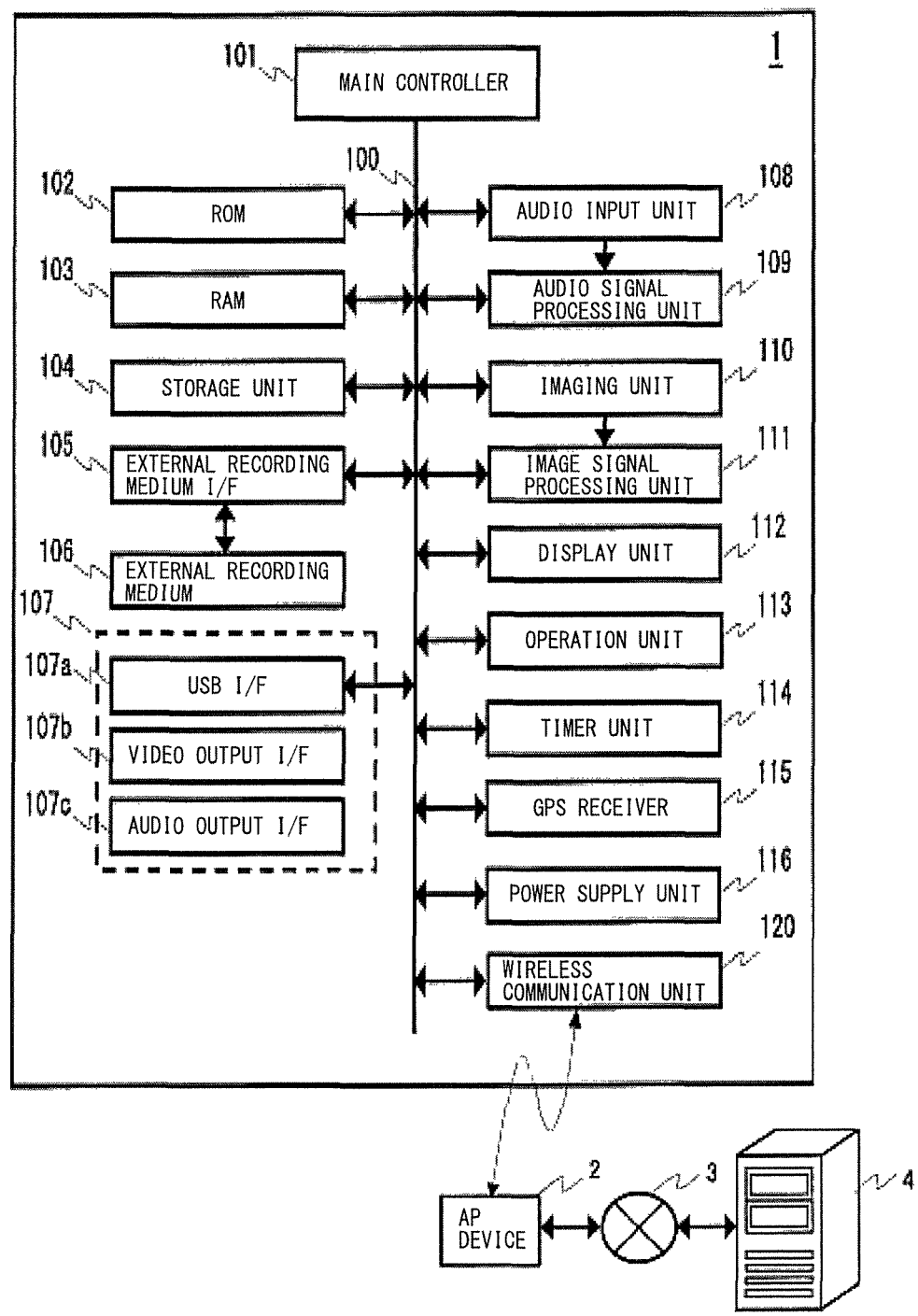
FIG. 20A is a block diagram showing a configuration example of the imaging device according to a fourth embodiment.
FIG. 20B is a diagram showing the software configuration of the imaging device according to the fourth embodiment.
Figure 20:
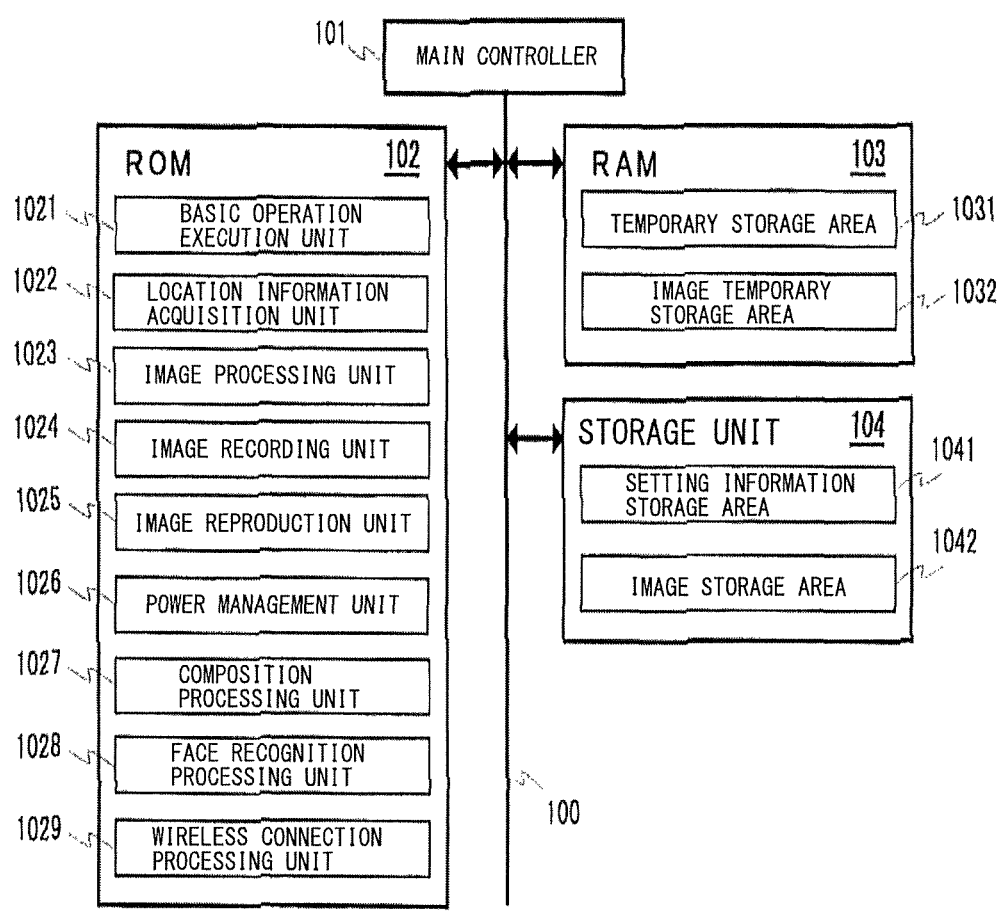

In FIG. 20A, the same processing units as those in FIG. 1A are denoted by the same reference numerals and the description thereof will be omitted.

FIG. 20A is a block diagram showing a configuration example of the imaging device according to the fourth embodiment. The imaging device 1 shown in FIG. 20A includes a wireless communication unit 120. The imaging device 1 is connected to an external network 3 through an access point device 2 to transmit and receive data with a server device 4 on the external network 3. It is assumed that the connection to the access point device 2 is established via a wireless connection such as Wi-Fi (registered trademark). The access point device 2 may be a base station of a mobile network operator. Further, the imaging device 1 may transmit and receive data through a smartphone or mobile terminal, instead of directly transmitting and receiving data with the access point device 2.

The server device 4 includes a plurality of image data with location information as well as a plurality of image data without location information. The imaging device 1 can obtain various image data through the access point device 2 and the network 3.

[Software Configuration of the Imaging Device]

FIG. 20B is a software configuration diagram of the imaging device 1 of this embodiment, in which the same processing units as those in FIG. 1B are denoted by the same reference numerals and the description thereof will be omitted.

FIG. 20B shows a software configuration diagram of the imaging device according to the fourth embodiment. The ROM 102 includes a wireless connection processing unit 1029, to perform the wireless connection process with the access point device 2 by controlling the wireless communication unit 120. Further, the location information acquisition unit 1022 performs the process of updating the location information of metadata of the image file recorded in the storage unit 104 of the body or in the external recording medium 106.

[Image Composition Process]

Figure 21:
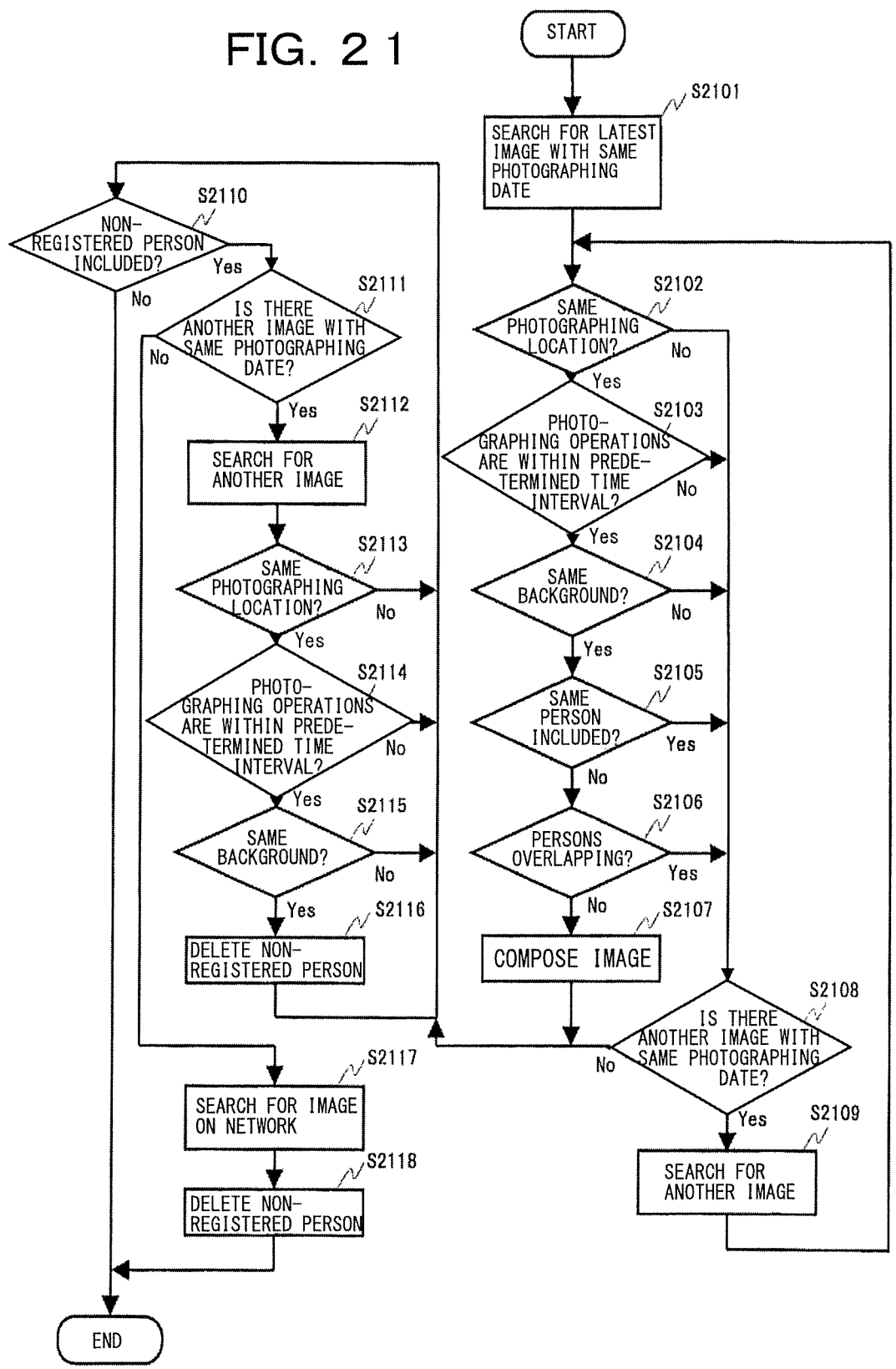
FIG. 21 is a flow chart showing an operation example of a composition processing unit according to the fourth embodiment.

Next, the image composition process will be described. FIG. 21 is a flow chart showing an operation example of the composition processing unit according to the fourth embodiment.

Of the steps, S2101 to S2110 are the same as S1701 to S1710 in FIG. 17, so that the description thereof will be omitted.

If a non-registered person is present in the image data (S2110: YES), the composition processing unit 1027 confirms whether or not another image is present in the image storage area 1042 of the storage unit 104 (S2111).

If another image is present (S2111: YES), the composition processing unit 1027 searches for another image (S2112). If another image is not present (S2111: NO), the composition processing unit 1027 proceeds to S2117.

Because S2113 to S2116 are the same as S1713 to S1716 in FIG. 17, the description thereof will be omitted.

If another image is not present in the image storage area 1042 of the storage unit 104 (S2111: NO), the imaging device 1 connects to the external network 3 through the access point device 2 to search for an image of the server device 4 on the external network 3 (S2117). Then, the composition processing unit 1027 performs the same process as S2116 by using the image on the network to delete the non-registered person (S2118).

By performing the above described process from S2101 to S2118, the composition processing unit 1027 searches for an image to be attached to the display image, extracts the registered person, and composes the particular person while deleting the non-registered person.

Figure 22:
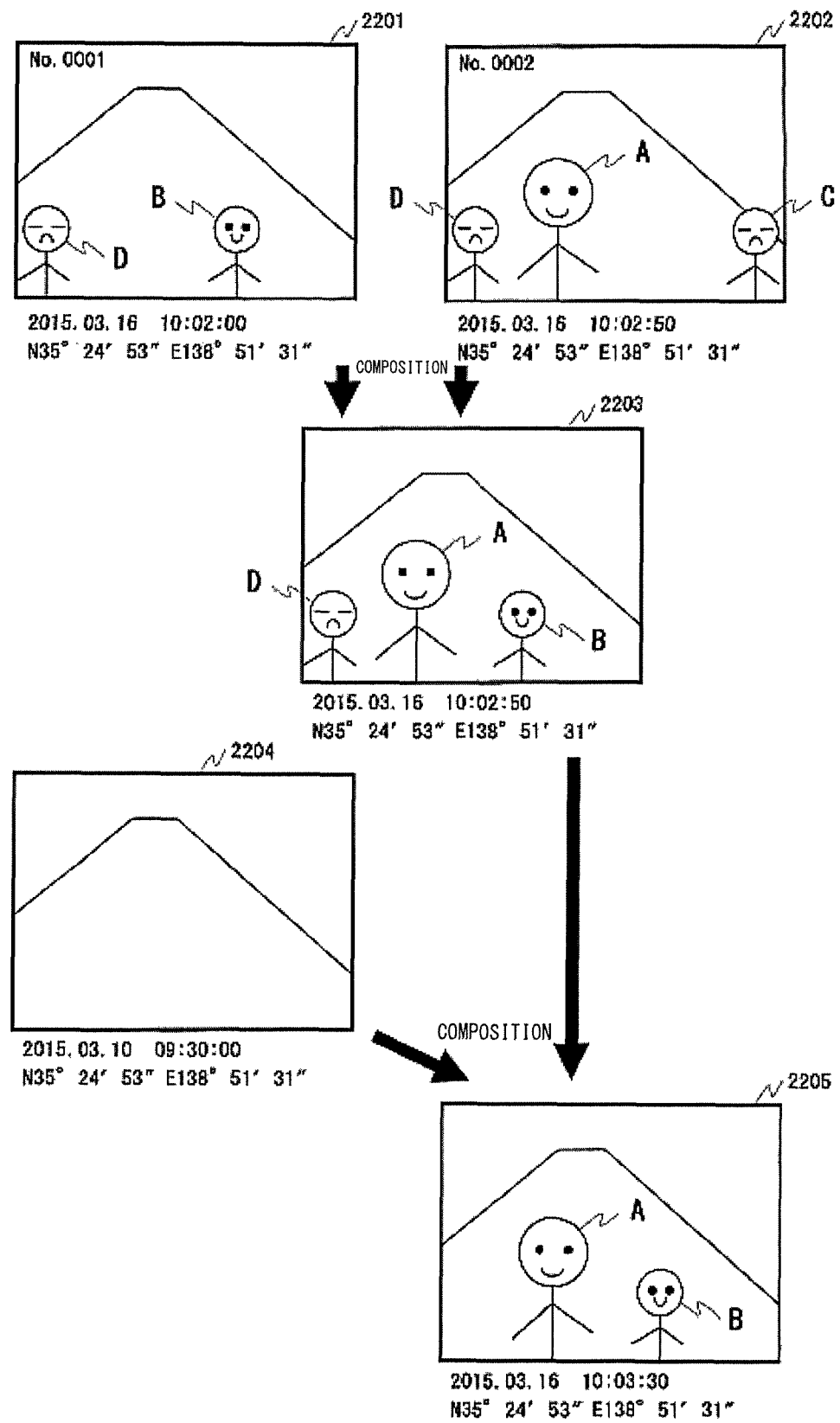
FIG. 22 is an illustrative example of the search and composition of image data according to the fourth embodiment.

FIG. 22 is an illustrative example of the search and composition of image data according to the fourth embodiment.

Image data 2201 to 2203 are the image data that are photographed in series at 35° 24'53" North Latitude and 138° 51'31" East Longitude from 10:02:00 to 10:02:50 on 2015 Mar. 16. The background is the same in the image data 2201 to 2203.

The image data 2201 is the image data of the person B photographed by the person A, in which the non-registered person D is also photographed. The image data 2202 is the image data of the person A photographed by the person B, in which the non-registered persons C and D are also photographed. The persons A and B are registered in advance as important persons. Further, when the user photographs a person by touching the person displayed on the display unit 112 with a touch sensor instead of pressing down the shutter button 113-2, the particular person may also be registered as an important person.

When the shutter button 113-2 of the imaging device 1 is pressed, the object is photographed and the photographed image is displayed on the display unit 112. Then, when the composition button 113-6 is pressed, the image is composed.

The composite image data 2203 is the image data obtained by compositing the registered persons from the image data 2201 and 2202 while deleting the non-registered person C.

For example, the composition processing unit 1027 extracts the person B of the image data 2201 through contour detection, and attaches the extracted person B to the image data 2202 with reference to the background, while deleting the non-registered person C by attaching the background of the image data 2201 at the position where the non-registered person C of the image data 2202 is present, to the non-registered person C of the image data 2202. Alternatively, the composition processing unit 1027 extracts the person A of the image data 2202 through contour detection, and attaches the extracted person A to the image data 2201 with reference to the background. If a non-registered person is present in either one or both of the image data, the composition processing unit 1027 can extract a registered person from the image data with larger number of non-registered persons and attach the extracted registered person to the image data with smaller number of registered persons.

Then, the non-registered person D can be deleted by re-photographing the image (background image) with the same background in which the non-registered person D is not present and by attaching the re-photographed image to the non-registered person D.

However, if the non-registered person D does not leave the place for a long time, it is difficult to photograph the image (background image) with the same background in which the non-registered person D is not present.

Thus, the non-registered person D is deleted by searching for image data publicly available on the network, and attaching the searched image data 2204 (photographed at 35° 24'53" North Latitude and 138° 51'31" East Longitude at the time of 9:30:00 on 2015 Mar. 10). The search of image data is performed by pattern matching to find similar image data. It may also be possible to search using keywords such as photographing location, photographing season, and photographing date and time.

The composite image data 2205 is the image data obtained by deleting the non-registered person D from the composite image data 2203 by using the image data 2204 searched on the network.

The composition processing unit 1027 deletes the non-registered person D by attaching the background of the image data 2204 at the position where the non-registered person D of the composite image data 2203 is present, to the non-registered person D of the composite image data 2203.

As described above, according to the present embodiment, it is possible to obtain the same effect as the third embodiment, and to search for image data publicly available on the network to delete the non-registered person by using the searched image data.

Further, it may also be possible to compose the image data photographed by the user in the same location, with reference to the photographing location of the image data publicly available on the network.

While the above has described embodiments of the present invention, it goes without saying that the configurations for implementing the technique of the present invention are not limited to the above described embodiments, and different variations may be possible. For example, a part of the configuration of an embodiment can be replaced by the configuration of another embodiment. Further, the configuration of another embodiment can be added to the configuration of an embodiment. All these variations belong to the scope of the present invention. Furthermore, the numbers, messages, and the like that appear in the description and drawings are merely examples, and the effects of the present invention may not be impaired if different values are used.

Further, the programs described in each of the process examples may be independent of each other, and a plurality of programs may configure a single application program. Further, the order of each process may be changed when performing each of the processes.

With respect to the above described functions or other characteristics of the present invention, part or all of them may be achieved by hardware, for example, in such a way that they are designed with an integrated circuit. Further, it may also be possible to achieve them by software in such a way that a microprocessor unit or other devices interprets and executes operation programs for achieving the respective functions or other characteristics. The hardware and the software can be used together.

Further, the control lines and information lines shown in the drawings are those that indicate what is believed necessary for the explanation, and are not intended to represent all the control lines and information lines required on the product. In fact, almost all configurations can be considered as being connected to each other.

LIST OF REFERENCE SINGS

1 IMAGING DEVICE
101 MAIN CONTROLLER
102 ROM
103 RAM
104 STORAGE UNIT
106 EXTERNAL RECORDING MEDIUM
110 IMAGING UNIT
115 GPS RECEIVER
120 WIRELESS COMMUNICATION UNIT
1022 LOCATION INFORMATION ACQUISITION UNIT
1023 IMAGE PROCESSING UNIT
1024 IMAGE RECORDING UNIT
1025 IMAGE REPRODUCTION UNIT
1027 COMPOSITION PROCESSING UNIT
1028 FACE RECOGNITION PROCESSING UNIT

The invention claimed is:

1. An imaging device comprising:
an imager configured to capture an image of an object;
a memory storing the image from the imager;
an interface configured to receive a user instruction to select an image from images in the memory; and
a processor programmed to:
perform a face recognition process to identify a face of a person in an image; and
generate a composite image by performing a composition process so that a first person in a first image and a second person in a second image are included in one image,
wherein the first image is captured at a first timing, the second image is captured at a second timing different from that of the first image, and the first image includes a background that is a same as that of the second image,
wherein the processor recognizes a face of the first person by performing the face recognition process on the first image,
wherein when the second image is stored in the memory, the processor generates the composite image in which the first person and the second person are superimposed on the same background by using the first image and the second image, and
wherein the processor uses the second image selected by the user instruction from the memory to perform the composition process.

2. The imaging device according to claim 1, further comprising a display for displaying either a third image captured by the imager or a fourth image stored in the memory,
wherein the processor performs the face recognition process using the third or fourth image displayed on the display as the first image.

3. The imaging device according to claim 1,
wherein responsive to an instruction to start the composition process, the processor starts the face recognition process.

4. An imaging device comprising:
an imager configured to capture an images of an object;
a memory storing the image from the imager;
a processor programmed to:
perform a face recognition process to identify a face of a person in an image; and
generate a composite image by performing a composition process so that a first person in a first image and a second person in a second image are included in one image data; and
an interface configured to, when the imager captures an image data, set an automatic composition mode to allow the processor to perform the composition process,
wherein the first image is captured at a first timing, the second image is captured at a second timing different from that of the first image, and the first image includes a background that is a same as that of the second image,
wherein the processor recognizes a face of the first person by performing the face recognition process on the first image, and
wherein when the second image is stored in the memory, the processor generates the composite image in which the first person and the second person are superimposed on the same background by using the first image and the second image, and
wherein when the automatic composition mode is set, the imager generates an image and after that the processor starts the face recognition process on the image captured by the imager.

5. The imaging device according to claim 4,
wherein in an image captured by the imager, when there is an object area in which a person is captured at a position deviated from an image center of the image by a predetermined ratio or more, the processor starts the face recognition process on the image captured by the imager.

6. An imaging device comprising:
an imager configured to capture an image of an object;
a memory storing the image from the imager; and
a processor programmed to:
perform a face recognition process to identify a face of a person from an image; and
generate a composite image by performing a composition process so that a first person in a first image and a second person in a second image are included in one image data;
wherein the first image is captured at a first timing, the second image is captured at a second timing different from that of the first image, and the first image includes a background that is a same as that of the second image,
wherein the processor recognizes a face of the first person by performing the face recognition process on the first image, and
wherein when the second image is stored in the memory, the processor generates the composite image in which the first person and the second person are superimposed on the same background by using the first image and the second image,
wherein the memory stores a face image of a registered person to be composed, and
the processor compares a face recognition result of the face recognition process on the first image and the second image, with the face image of the registered person, and when determining that the face of a non-registered person other than the registered person is captured in the first image or in the second image, deletes an object area in which the non-registered person is captured, and composes the background in the deleted object area to generate the composite image.

7. The imaging device according to claim 6, further comprising a transceiver configured to wirelessly communicate with an external device,
wherein the processor obtains a third image with the same background from the external device through the transceiver, and composes the background in the deleted object area by using the third image.

8. An imaging device comprising:
an imager configured to capture an image of an object;
a memory storing the image from the imager; and
a processor programmed to:
- perform a face recognition process to identify a face of a person in an image; and
- obtain location information corresponding to a location in which the object is captured; and
- generate a composite image by performing a composition process so that a first person in a first image and a second person in a second image are included in one image data, wherein the first image is captured at a first timing, the second image is captured at a second timing different from that of the first image, and the first image includes a background that is a same as that of the second image, wherein the processor recognizes a face of the first person by performing the face recognition process on the first image, and wherein when the second image is stored in the memory, the processor generates the composite image in which the first person and the second person are superimposed on the same background by using the first image and the second image, and wherein the imager adds a third image to the location information and stores the location information, and wherein the processor extracts a candidate of the second image from the third image in the memory, on a search condition that the same location information as the location information added to the first image is added.

* * * * *